(12) United States Patent
Kyo

(10) Patent No.: US 8,769,244 B2
(45) Date of Patent: Jul. 1, 2014

(54) SIMD PARALLEL COMPUTER SYSTEM, SIMD PARALLEL COMPUTING METHOD, AND CONTROL PROGRAM

(75) Inventor: Shorin Kyo, Tokyo (JP)

(73) Assignee: Nec Corporation, Tokyo (JP)

(*) Notice: Subject to any disclaimer, the term of this patent is extended or adjusted under 35 U.S.C. 154(b) by 901 days.

(21) Appl. No.: 12/922,318

(22) PCT Filed: Apr. 8, 2009

(86) PCT No.: PCT/JP2009/057205
§ 371 (c)(1),
(2), (4) Date: Sep. 13, 2010

(87) PCT Pub. No.: WO2009/131007
PCT Pub. Date: Oct. 29, 2009

(65) Prior Publication Data
US 2011/0040952 A1  Feb. 17, 2011

(30) Foreign Application Priority Data
Apr. 22, 2008  (JP) ................................. 2008-111448

(51) Int. Cl.
*G06F 15/80*  (2006.01)
*G06F 9/50*  (2006.01)
*G06F 9/38*  (2006.01)

(52) U.S. Cl.
CPC .............. *G06F 15/80* (2013.01); *G06F 9/3836* (2013.01); *G06F 9/5083* (2013.01); *G06F 15/8015* (2013.01)
USPC .............................................. 712/22; 712/16

(58) Field of Classification Search
CPC ............. G06T 1/20; G06F 15/80; G06F 8/44; G06F 9/30; G06F 9/32; G06F 9/38; G06F 9/50
See application file for complete search history.

(56) References Cited

U.S. PATENT DOCUMENTS 5,542,074 A * 7/1996 Kim et al. .................... 712/22
6,118,901 A * 9/2000 Chen et al. ................. 382/236
(Continued)

FOREIGN PATENT DOCUMENTS

JP   58-200366 A   11/1983
JP   63-147257 A    6/1988
(Continued)

OTHER PUBLICATIONS

International Search Report for PCT/JP2009/057205 mailed Jul. 7, 2009.
(Continued)

*Primary Examiner* — Eric Coleman
(74) *Attorney, Agent, or Firm* — Sughrue Mion, PLLC

(57) ABSTRACT

Uniforming of the processing load is efficiently realized. Each processing element configuring an SIMD parallel computer system includes a data storage module that stores data processed or transferred, a number-of-data-sets storage device that stores number of data sets, and a front data storage device that stores the front data. Each processing element further includes a control processor that compares the number of data sets stored in one processing element with the number of data sets stored in the own processing element, and issues a data distribution leveling instruction that designates an action for updating contents of the data storage module, the number-of-data-sets storage device, and the front data storage device according to a rule determined based on a comparison result of the own processing element and that of the other processing elements and an action for moving the data stored in the one processing element to the own processing element.

7 Claims, 16 Drawing Sheets

(56) References Cited

U.S. PATENT DOCUMENTS

| | | | | |
|---|---|---|---|---|
| 6,148,111 A | * | 11/2000 | Creusere | 382/240 |
| 2004/0111540 A1 | * | 6/2004 | Narad | 710/52 |
| 2004/0216115 A1 | * | 10/2004 | Beaumont | 718/105 |

FOREIGN PATENT DOCUMENTS

| | | |
|---|---|---|
| JP | 6-266859 A | 9/1994 |
| JP | 7-13958 A | 1/1995 |
| JP | 2003316754 A | 11/2003 |
| JP | 2004362253 A | 12/2004 |
| WO | 2007/099950 A1 | 9/2007 |

OTHER PUBLICATIONS

S. Kyo et al., "A Video Recognition Processor for Intelligent Cruise Based on 128 4-Way VLIW RSIC Processing Elements", IEICE Technical Report, ICD, May 2003, vol. 103, No. 89, pp. 19-24.

Supplementary European Search Report for EP 09 73 4849 issued Oct. 11, 2011.

S. Kyo et al., "An Integrated Memory Array Processor for Embedded Image Recognition Systems", IEEE Transactions on Computers, vol. 56, No. 5, May 2007, pp. 622-834.

Japanese Office Action for JP Application No. 2010-509135 mailed on Jul. 9, 2013 with Partial English Translation.

* cited by examiner

FIG.3

| | | CURRENT CYCLE | | | NEXT CYCLE | |
|---|---|---|---|---|---|---|
| cf | cf_right | (wen) OUTPUT OF LOGICAL PRODUCT OPERATION UNIT | OPERATION TYPES OF ADD/SUBTRACTION OPERATION UNIT | OUTPUT OF EXCLUSIVE OR OPERATION UNIT | (addr)VALUE OF REGISTER(cntr) (next cntr) | VALUE OF REGISTER(md) (next md) |
| 0 | 0 | 0 | − | 0 | cntr | dout |
| 0 | 1 | 0 | − | 1 | cntr−1 | dout |
| 1 | 0 | 1 | + | 1 | cntr+1 | md_left |
| 1 | 1 | 0 | − | 0 | cntr | md_left |

FIG.6

| cf | cf_left | CURRENT CYCLE | | | NEXT CYCLE | |
| --- | --- | --- | --- | --- | --- | --- |
| | | (wen) OUTPUT OF LOGICAL PRODUCT OPERATION UNIT | OPERATION TYPES OF ADD/SUBTRACTION OPERATION UNIT | OUTPUT OF EXCLUSIVE OR OPERATION UNIT | (addr)VALUE OF REGISTER (cntr)(next cntr) | VALUE OF REGISTER(md) (next md) |
| 0 | 0 | 0 | − | 0 | cntr | dout |
| 0 | 1 | 0 | − | 1 | cntr−1 | dout |
| 1 | 0 | 1 | + | 1 | cntr+1 | md_right |
| 1 | 1 | 0 | − | 0 | cntr | md_right |

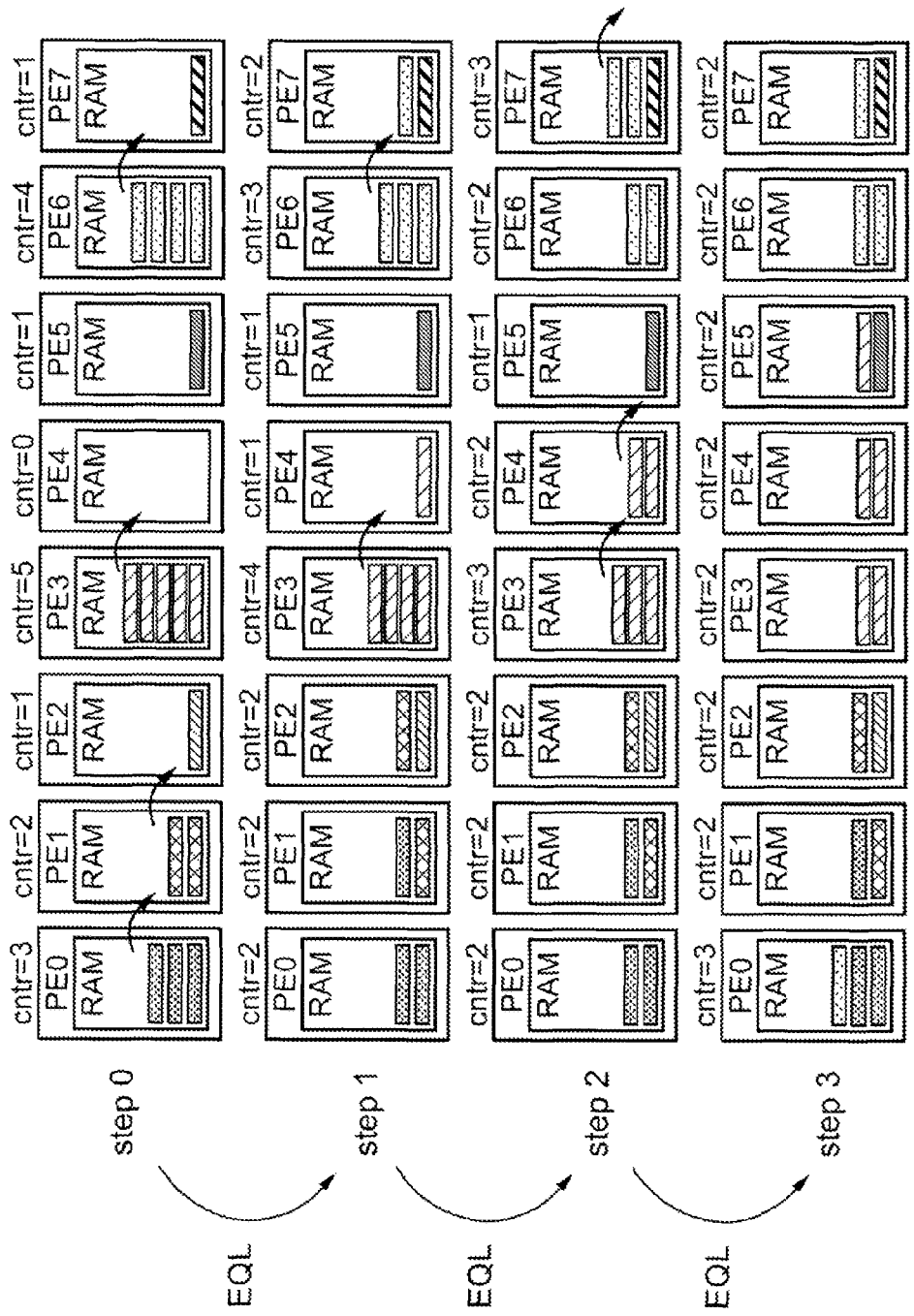

FIG.8

/* LOT-NUMBER A */ CALLI Fadd_allpe cntr // PROCESSING FOR CALLING FUNCTION add_allpe, OBTAINING TOTAL SUM OF cntr REGISTERS OF ENTIRE PES, AND STORING IT TO REGISTER r0 AS RETURN VALUE (S101)

/* LOT-NUMBER A+1 */ CDIV r0.PENO.H // CONSTANT SHOWING PE NUMBER INFORMATION PROCESSING FOR DIVIDING r0 WITH PENO, AND STORING RESULT TO REGISTER H (S102)

/* LOT-NUMBER A+2 */ MVCP H.h // PROCESSING FOR TRANSFERRING VALUE OF H TO h REGISTER OF EACH PE (S103)

/* LOT-NUMBER A+3 */ EQL.. (S111)   /* LOT-NUMBER A+4 */ ASUB h,cntr,tmp (S112)

/* LOT-NUMBER A+5 */ EQL.. (S113)   /* LOT-NUMBER A+6 */ SUB 1,tmp,tmp (S114)

/* LOT-NUMBER A+7 */ EQL.. (S115)   /* LOT-NUMBER A+8 */ STS %s (S116)

/* LOT-NUMBER A+9 */ BRM AGAIN. (S117)   /* LOT-NUMBER A+10 */ EQL (S118)

/* LOT-NUMBER A+11 */

AGAIN: (S110)

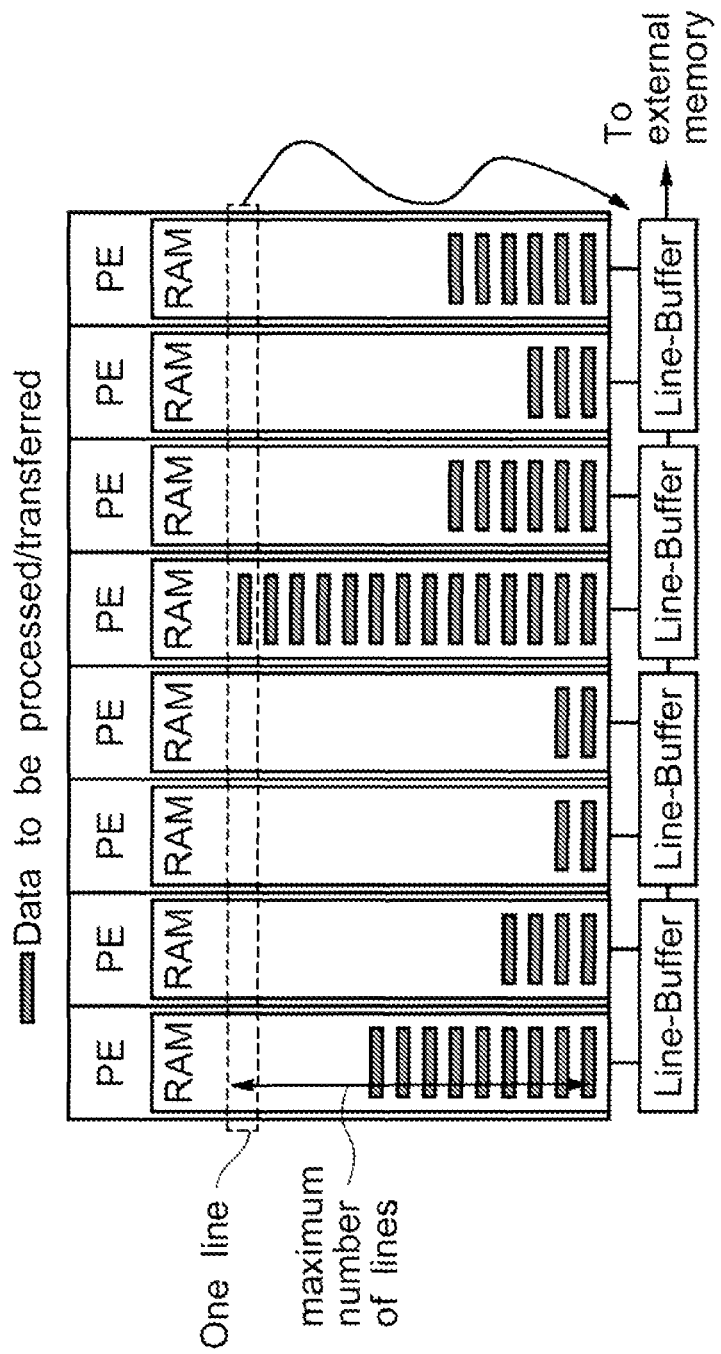

SIMD PARALLEL COMPUTER SYSTEM, SIMD PARALLEL COMPUTING METHOD, AND CONTROL PROGRAM

TECHNICAL FIELD

The present invention relates to an SIMD parallel computer system. More specifically, the present invention relates to an SIMD parallel computer system configured with a great number of combined processing elements (PE) controlled by a single control processor (CP), and to an SIMD parallel computing method as well as a control program.

BACKGROUND ART

As an example of a parallel computer system, there is known an SIMD (Single Instruction Multiple Data) parallel computer system that is used for image processing of video signals, for example.

As a related technique of such SIMD parallel computer system, there is Non-Patent Document shown below, for example.

In the SIMD parallel computer system presented in Non-Patent Document 1, each processing element (PE) is coupled in a ring form by a coupling line, and each PE is SIMD-controlled by a control processor (CP). With this SIMD control, each processing element (PE) applies an instruction issued by the control processor to data on its local memory so as to implement parallel processing by a plurality of processing elements (PE).

Further, as shown in FIG. 16, Non-Patent Document 1 also discloses a structure which performs memory transfer with an external memory via a line buffer by having data (one line) that is over a block of memories (RAMs) of the entire processing elements (PE) as a unit.

In the meantime, as another example of the parallel computer system, there is known an MIMD (Multiple Instruction Multiple Data) parallel computer system in which each of a plurality of processors processes different data independently. As an example of a related technique of the MIMD parallel computer system, there is Patent Document 1 shown below, for example.

As a method directed to the MIMD parallel computer system, Patent Document 1 discloses a structure in which values indicating data amount are exchanged with each other among the processors in parallel, scheduling by a prescribed simulation is executed in parallel by each of the processors, and the data is transmitted and redistributed among the processors based on the result of the scheduling.

Further, in Patent Document 1, a single processor includes a CPU and communication processors CM1-CML which perform transmission and reception with neighboring L-pieces of processors for performing scheduling by the prescribed simulation. Furthermore, the communication processors CM1-CML are connected to the neighboring processors via L-pieces of channels (communication paths).

Non-Patent Document 1: Shorin KYO, "A Video Recognition Processor for Intelligent Cruise Control Based on 128 4-Way VLIW RISC Processing Elements" IEICE Technical Report, ICD, May, 2003, Vol. 103, No. 89, pp. 19-24

Patent Document 1: Japanese Unexamined patent Publication Sho 63-147257

DISCLOSURE OF THE INVENTION

Problems to be Solved by the Invention

The SIMD parallel computer system of Non-Patent Document 1 is in the structure which performs parallel processing on the different data values under a single instruction stream as described above. Thus, in a case where the number of data to be calculated varies among the processing elements (PE), even the processing element (PE) that has completed the processing because the number of data to be calculated is small can shift to next processing only after all the processing elements (PE) complete the current processing.

Therefore, the time required for each processing is normally dominated by the PE that requires the longest processing time.

Further, in a case where the number of data to be transferred varies for each of the processing elements (PE) with the SIMD parallel computer system of Non-Patent Document 1, the processing time required for transferring the data to an external memory is dominated by the maximum value (the maximum number of lines in the case of FIG. 15) of the number of transfer data among all the processing elements (PE).

Thus, even in a data distribution state (line distribution state) shown in FIG. 15 where the number of transfer data is the same and in a data distribution state shown in FIG. 16, about twice or more processing time is required for transferring the data in a case where there is deviation in the layout of the data among the processing elements of the data distribution state (line distribution state) shown in FIG. 15 than the case of the data distribution state shown in FIG. 16.

Further, with Patent Document 1, it is necessary to perform scheduling by the prescribed simulation through exchanging the numerical values indicating the data amount among each of the processors in parallel when redistributing the data to each processor. Thus, the processing time is increased in accordance with an increase in the number of processors. Furthermore, with Patent Document 1, complicated equipment such as the communication processors CM1-CML and the L-pieces of channels (communication paths) is required for each processor, so that the hardware cost is increased.

An object of the present invention is to provide an SIMD parallel computer system, an SIMD parallel computing method, and a control program, which are capable of efficiently uniformanizing the allotted number of processing for each of the processing elements (PE) in a case of processing where there is no specific selection made in the number of transfer target data or the processing element (PE) when performing memory transfer to the outside.

SUMMARY OF THE INVENTION

In order to achieve the foregoing object, the SIMD parallel computer system according to the present invention is characterized as an SIMD parallel computer system that performs parallel processing with two or more processing elements coupled in a ring form for different data values under a single instruction stream, wherein each of the processing elements includes: a data storage module, that stores data processed or transferred by each of the processing elements; a number-of-data-sets storage device that stores number of data sets of the processing data or the transfer data; and a front data storage device that stores the front data from the processing data or the transfer data stored in the data storage module. The system further includes a control processor that compares the number of data sets of the processing data or the transfer data stored in the number-of-data-sets storage device of one neighboring processing element out of the two or more processing elements coupled in the ring form with the number of data sets of the processing data or the transfer data stored in the number-of-data-sets storage device of the own processing element, and issues, to each of the processing elements, a data distribution leveling instruction that designates an action for updating contents of the data stored in the data storage module, the number-of-data-sets storage device, and the front data storage device of the own processing element according to a rule that is determined based on a comparison result of the own processing element, and a comparison result of the other processing elements and an action for moving the processing data or the transfer data stored in the one neighboring processing element to the data storage module and the front data storage device of the own processing element.

The SIMD parallel computing method according to the present invention is characterized as an SIMD parallel computing method that performs parallel processing with two or more processing elements coupled in a ring form for different data values under a single instruction stream, and the method includes: comparing the number of data sets of processing data or transfer data stored in one neighboring processing element out of the two or more processing elements coupled in the ring form with the number of data sets of processing data or transfer data stored in the own processing element; and causing each of the processing elements to implement an action for updating contents of the data stored in the own processing element according to a rule that is determined based on the comparison result and a comparison result of the other neighboring processing elements, and an action for moving the processing data or transfer data stored in the one neighboring processing element to the own processing element.

The SIMD parallel computer control program according to the present invention is characterized as a control program that performs controls of parallel processing with two or more processing elements coupled in a ring form in an SIMD parallel computing system for different data values under a single instruction stream, wherein each of the processing elements includes: a data storage module that stores data processed by each of the processing elements; a number-of-data-sets storage device that stores number of data sets of the data; and a data storage device that stores a part of the data stored in the data storage module. The program causes a computer to execute: a function that compares the number of data sets of the data stored in the number-of-data-sets storage device of one processing element out of the two or more processing elements coupled in the ring form with the number of data sets of the data stored in the number-of-data-sets storage device of the own processing element; a function that issues, to each of the processing elements, an instruction designating an action for updating contents of the data stored in the data storage module, the number-of-data-sets storage device, and the data storage device of the own processing element according to a rule that is determined based on a comparison result of the own processing element and a comparison result of the other processing elements acquired; and a function that issues, to each of the processing elements, an instruction designating an action for moving the data stored in the one processing element to the own processing element.

The present invention is capable of implementing the data distribution leveling instruction EQL with a simple and less-operation combination, so that it can be loaded in a single machine cycle, and it is possible to efficiently perform processing for uniformizing the number of data by suppressing the increase in the hardware cost to be small.

BRIEF DESCRIPTION OF THE DRAWINGS

FIG. 3 is a truth-value table for describing an example of actions of each unit in the PE of the SIMD parallel computer system shown in FIG. 1;

FIG. 6 is a truth-value table for describing an example of actions of each unit in the PE of the SIMD parallel computer system shown in FIG. 1;

FIG. 7 is an explanatory chart for describing the state and result of actions of each PE by each cycle in an SIMD parallel computer system according to a third embodiment of the present invention;

FIG. 8 is an explanatory chart for describing an example of program codes capable of performing data distribution leveling conducted by a control processor of the SIMD parallel computer system according to the third embodiment of the present invention;

FIG. 16 is an explanatory chart for describing a state where the numbers of processing data sets are not leveled among PEs in an SIMD parallel computer system of a related technique.

DETAILED DESCRIPTION

Figure 1:
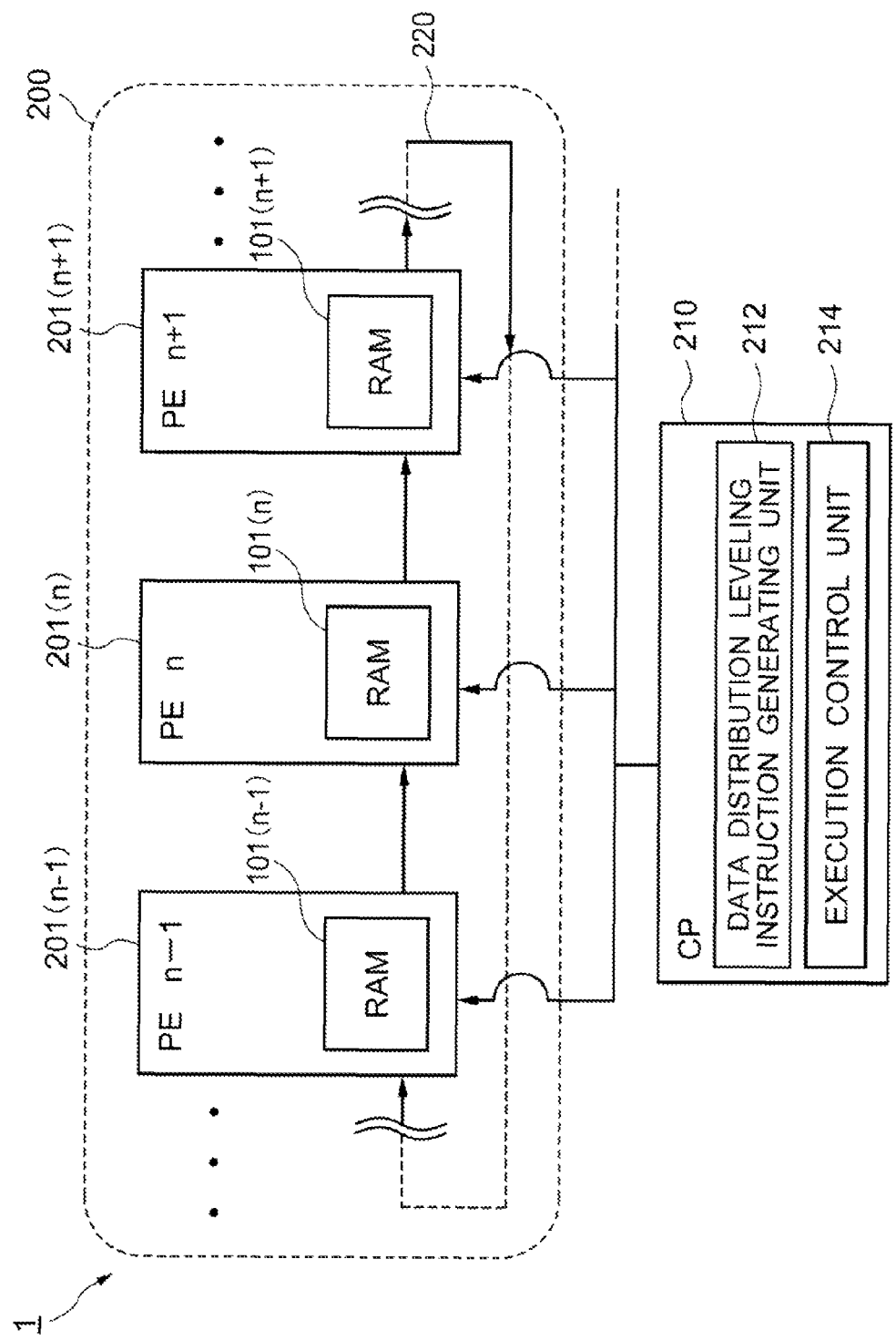
FIG. 1 is a block diagram showing an example of a schematic structure of an entire SIMD parallel computer system according to a first embodiment of the present invention.

Hereinafter, embodiments of the present invention will be described in details by referring to the drawings.

As shown in FIG. 1, FIG. 2, FIG. 4, FIG. 5, and FIG. 12, an SIMD parallel computer system according to an embodiment of the present invention is a system that performs parallel processing by two or more processing elements 201 (201($n-1$), 201($n$), 201($n+1$): a PE array 200) coupled in a ring form for different data values under a single instruction stream. As the basic structure, each of the processing elements 201 is characterized to include: data storage modules 101 (101($n-1$), 101($n$), 101($n+1$)) for storing data (processing data or transfer data) processed by each of the processing elements 200; number-of-data-sets storage devices 102 (102($n-1$), 102($n$), 102($n+1$)) for storing the number of data sets of the processing data or the transfer data; and data storage devices (103(n−1), 103(n), 103(n+1)) for storing a part of the data (e.g., front data) stored in the data storage module 101.

Further, the SIMD parallel computer system includes a control processor 201 (including 104, 105, 106, and 107) which compares the number of data sets of the data (processing data or transfer data) stored in the number-of-data-sets storage device 102 of one element out of the two or more processing elements 201 coupled in a ring form with the number of data sets of the data stored in the number-of-data-sets storage device 102 of the own processing element, and issues, to each of the processing elements 201, a data distribution standardized EQL that designates an action for updating the contents of the data stored in the data storage module 101, the number-of-data-sets storage device 102, and the front data storage device 103 of the own processing element 201 according to a rule that is determined based on a comparison result of the own processing element and a comparison result of the other processing elements, and an action for moving the processing data or the transfer data stored in the neighboring processing element 201 to the data storage module 101 and the front data storage device 103 of the own processing element 201.

In the embodiment of the present invention, when performing parallel processing for the different data values under a single instruction stream by the two or more processing elements coupled in a ring form, the number of data sets of the data stored in one processing element 200 out of the two or more processing elements 201 coupled in a ring form is compared with the number of data sets of the data stored in the own processing element. Then, the action for updating the contents of the data stored in the own processing element 201 according to the rule that is determined based on the comparison result and a comparison result of the other processing element 201 and the action for moving the data stored in the neighboring processing element 201 to the own processing element 201 are executed by each of the processing elements.

More specifically, the control processor 210 (including 104, 105, 106, and 107) according to the embodiment of the invention calculates carry flag information cf, when a former number-of-data-sets cntr_left (or cntr_right) out of the numbers of data sets to be compared is larger than a latter number-of-data-sets cntr. As the carry flag information cf, the control processor 210 (including 104, 105, and 106) calculates carry flag information "1" when the former number-of-data-sets cntr_left (or cntr_right) out of the number of data sets to be compared is larger than the latter number-of-data-sets cntr, and calculates carry flag information "0" when the former is smaller.

As the rule, the control processor 210 (including 104, 105, 106, and 107) carries following information.

(1) The contents in the number-of-data-sets storage device 102 and the front data storage device 103 of the own processing element 201 are not updated, when the carry flag information in the own processing element 201 is "0" and the carry flag information in the neighboring processing element 201 is "0".

(2) The number of data sets of the number-of-data-sets storage device 102 of the own processing element 201 is decremented by 1, and the content of the front data storage device 103 is updated with next processing data or next transfer data following the front data, when the carry flag information in the own processing element 201 is "0" and the carry flag information in the neighboring processing element 201 is "1".

(3) The number of data sets of the number-of-data-sets storage device 102 of the own processing element 201 is incremented by and the content of the front data storage device 103 is updated with the content of the front data of the processing data or the transfer data of the neighboring processing element 201, when the carry flag information in the own processing element 201 is "1" and the carry flag information in the neighboring processing element 201 is "0".

(4) The number of data sets of the number-of-data-sets storage device 102 of the own processing element 201 is not updated, and the content of the front data storage device 103 is updated with the content of the front data of the processing data or the transfer data of the neighboring processing element 201, when the carry flag information in the own processing element 201 is "1" and the carry flag information in the neighboring processing element 201 is "1".

The control processor 210 (including 104, 105, 106, and 107) issues a data distribution leveling instruction EQL based on the rule, obtains the average value of the numbers of data sets of the processing data or the transfer data over the entire processing elements 201 coupled in a ring form, and issues the data distribution leveling instruction until the difference between the number of data sets of the processing data or the transfer data of the entire processing 201 and the average values becomes equal to or less than a threshold value.

As described above, the control processor 210 obtains the average value of the number-of-data-sets cntr value over the entire processing 201, and controls the PE array 200 by repeatedly issuing the data distribution leveling instruction EQL until the difference between the number-of-data-sets cntr value of the entire processing 201 and the average value comes equal or less than the threshold value (for example, "1"). Thereby, through executing the data distribution leveling instructions for the number of times about equal to the sum of the difference between the maximum value and the minimum value of the number-of-data-sets cntr and the number of the entire processing 201, the processing data or the transfer data of the entire processing 201 can be leveled almost to the same number.

The "data distribution leveling instruction EQL" can be implemented with a simple and less-calculation combination with the SIMD parallel computer system of such structure, so that it can be loaded in a single machine cycle. In the meantime, it takes about ten machine cycles for the SIMD parallel computer system having no EQL instruction such as the one disclosed in Non-Patent Document 1, for example, to perform the processing corresponding to the EQL instruction.

Therefore, the SIMD parallel computer system having the "data distribution leveling instruction EQL" according to the embodiment of the present invention can efficiently implement the processing for leveling the numbers of data sets while suppressing the increase in the hardware cost to be small.

Hereinafter, a more concretive example of such "SIMD parallel computer system" according to the present invention will be described by referring to the drawings. In the explanations below, registers are used as the number-of-data-sets storage device 102 and the front data storage device 103, and a RAM (Random Access Memory) is used as the data storage module 101. Further, explanations are provided by having the own processing element as the processing element 201(n) shown in the drawing, and the neighboring processing element as the processing element 201(n−1) or the processing element 201(n+1).

First Embodiment

Overall Structure of SIMD Parallel Computer System

Regarding the specific structure of the SIMD parallel computer system according to the embodiment, the overall structure will be described first, and detailed structures of each component will be described thereafter. FIG. 1 is a block diagram showing an example of the overall schematic structure of the SIMD parallel computer system according to the first embodiment of the present invention.

As shown in FIG. 1, the SIMD parallel computer system 1 according to the embodiment includes: the processing element array (PE array) 200 formed by coupling a great number of processing elements (PE) 201($n$−1), 201($n$), 201($n$+1), - - - in a ring form; and the control processor (CP) 210 for controlling the entire PE array 200 by supplying instructions to the PE array 200.

Further, the neighboring processing elements 201($n$−1) and 201($n$) as well as the neighboring processing elements (n) and 201($n$+1) are connected in a ring form bidirectionally via a network or an inter-PE coupling line 220.

Regarding each of the processing elements 201, the processing element 201 on the rightmost end of the drawing is connected to the processing element 201 on the leftmost end to be coupled in a ring form. Further, the coupling line 220 between the processing elements 201 enables transmission and reception of information bidirectionally.

In the embodiment, transfer data transferred between each of the processing elements 201 in the data leveling processing can be transferred in one direction from the left side of the drawing to the right side. However, other control information such as carry flag information cf to be described later and processing data are exchanged between the processing elements 201 bidirectionally. Thus, the inter-PE coupling line 220 may include a coupling line for the data to be transferred in the data leveling processing and a coupling line for transferring other control information.

Each of the processing element 201($n$−1), the processing element 201($n$), the processing element 201($n$+1), - - - includes a RAM 101($n$−1), a RAM 101($n$), a RAM 101($n$+1), - - -, respectively, as the data storage module that can be accessed individually.

The control processor 210 includes: a data distribution leveling instruction generating unit 212 which generates and outputs the data distribution leveling instruction EQL for executing the processing action for leveling the numbers of data sets of the processing data for each of the processing elements 201 or the numbers of data sets of the memory transfer data towards the outside among each of the processing elements 201; and an execution control unit 214 which controls the processing action for repeatedly executing the data distribution leveling instruction EQL to each of the processing elements 201. Further, the control processor 210 includes a subtraction operation unit (sub) 104, an exclusive OR operation unit (xor) 106, and an add/subtraction operation unit 107 mounted to each of the processing elements 201.

(Detailed Structure of Processing Element)

Figure 2:
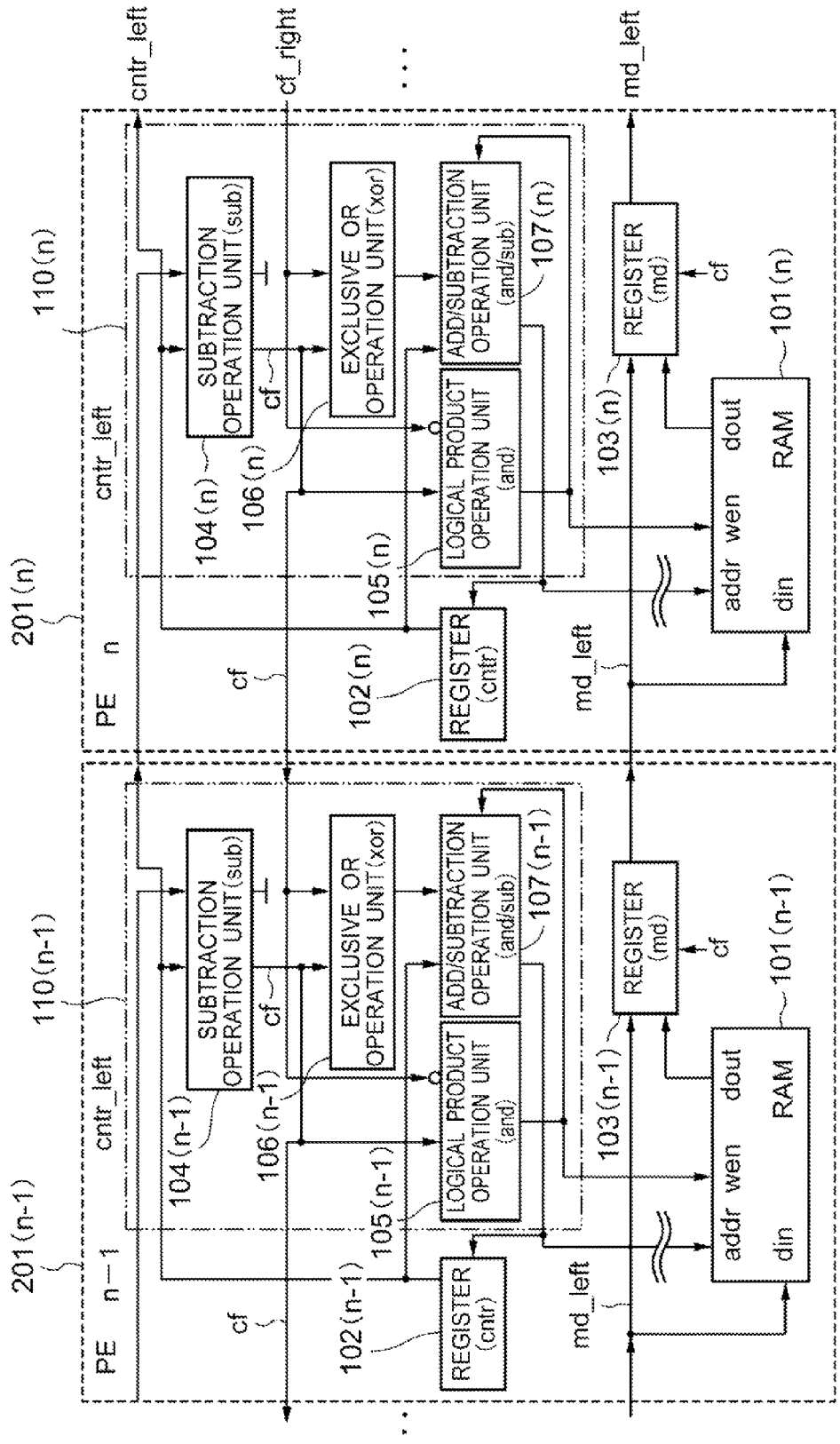
FIG. 2 is a block diagram showing a detailed structure of PE of the SIMD parallel computer system shown in FIG. 1.

More specifically, as shown in FIG. 2, each processing element 201 includes: the RAM 101 (data storage module) which stores data such as processing data or transfer data (data itself or related information thereof); the register (cntr) 102 (number-of-data-sets storage device) which stores the number of data sets of the data; and the register (md) 103 (front data storage device) which stores the front data among the data stored within the RAM 101.

Further, when the data distribution leveling instruction EQL is issued, the processing element 201($n$) receives the number-of-data-sets cntr stored in the register 102($n$−1) of the neighboring processing element 201($n$−1) on the left side as the number-of-data-sets cntr_left from the neighboring processing element 201($n$−1) on the left side. Further, the processing element 201($n$) receives the front data md stored in the register 103($n$−1) of the neighboring processing element 201($n$−1) on the left side as the front data md_left from the neighboring processing element 201($n$−1) on the left side. Furthermore, the processing element 201($n$) receives the carry flag information cf of the neighboring processing element 201($n$−1) on the right side as the carry flag information cf_right from the neighboring processing element 201($n$−1) on the right side via the coupling line 220 as the input.

Note here that the carry flag information cf is the information that is outputted by the subtraction operation unit 104 to be described later according to the result of comparison made between the number-of-data-sets cntr stored in the register 102($n$) of the own processing element 201($n$) and the number-of-data-sets cntr_left stored in the register 102($n$−1) of the neighboring processing element (n−1) on the left side.

Further, referring to FIG. 2, in the control processor 210 which controls the SIMD parallel computing system 1 to execute the data distribution leveling instruction EQL according to the first embodiment, each of the processing elements 201 includes the subtraction operation unit (sub) 104, the exclusive OR operation unit (xor) 106, a logical product operation unit (and) 105, and the add/subtraction operation unit (add/sub) 107, and those units start up by the EQL instruction that is generated and issued by the data distribution leveling instruction generating unit 212.

Note here that a leveling processing unit 110 is formed with the subtraction operation unit (sub) 104, the exclusive OR operation unit (xor) 106, the logical product operation unit (and) 105, and the add/subtraction operation unit (add/sub) 107 of the embodiment.

In the explanations below, the structure of the subtraction operation unit 104($n$), the exclusive OR operation unit 106($n$), the logical product operation unit 105($n$), and the add/subtraction operation unit 107($n$) mounted to the own processing element 201($n$) will be described. However, for the left-side processing element 201($n$−1) or the right-side processing element 201($n$+1) neighboring to the own processing element 201($n$) to execute the data distribution leveling instruction EQL, the subtraction operation units 104($n$−1), ($n$+1), the exclusive OR operation units 106($n$−1), ($n$+1), the logical product operation units 105($n$−1), ($n$+1) and the add/subtraction operation units 107($n$−1), ($n$+1) of those processing elements 201($n$−1), ($n$+1) are also structured in the same manner.

The subtraction operation unit 104 of the own processing element 201($n$) compares the number-of-data-sets cntr stored in the register 102($n$) of the own processing element 201($n$) with the number-of-data-sets cntr_left stored in the register 102($n$−1) of the neighboring processing element 201($n$−1) on the left side. Specifically, the subtraction operation unit 104 performs subtraction processing on those numbers of data sets, and outputs the carry flag information cf "1" when the former number-of-data-sets cntr_left is larger than the latter number-of-data-sets cntr, and outputs carry flag information "0" when it is not. Then, the subtraction operation unit 104 of the own processing element 201($n$) sends the value of the carry flag information cf to the register 103($n$), the logical product operation unit 105($n$), and the exclusive OR operation unit 106($n$) of the own processing element 201($n$), respectively.

The register (md) 103($n$) of the own processing element 201($n$) stores the front data md out of the processing data or the transfer data stored in the RAM 101($n$−1) of the own processing element 201($n$). Further, when the carry flag information cf that is the output from the subtraction operation unit 104($n$) of the own processing element 201($n$) is "1", the register 103($n$) updates the content of the stored front data md to the content of the front data and left stored in the register 103($n$−1) of the neighboring processing element 201($n$−1) on the left side.

Furthermore, when the carry flag information cf that is the output from the subtraction operation unit 104($n$) of the own processing element 201($n$) is "0", the register (md) 103($n$) of the own processing element 201 updates the content of the front data and with an output dout of a read access of a previous cycle for the RAM 101($n$) of the own processing element 201($n$).

The logical product operation unit 105($n$) of the own processing element 201($n$) calculates a logical product of the carry flag information cf_right that is an inversion of the carry flag information cf outputted from the subtraction operation unit 104($n$+1) of the neighboring processing element 201($n$+1) on the right side and the carry flag information cf outputted from the subtraction operation unit 104($n$) of the own processing element 201($n$), and outputs the result to the RAM 101($n$) and the add/subtraction operation unit 107($n$) of the own processing element 201($n$).

The RAM 101($n$) uses the output of the logical product operation unit 105($n$) as a write permission signal (write enable signal) wen. Further, the add/subtraction operation unit 107($n$) uses the output of the logical product operation unit 105($n$) as an add/subtraction selection signal which indicates whether to perform an adding operation (the case where the output result of the logical product operation unit 105($n$) is "1") or a subtraction operation (the case where the output result of the logical product operation unit 105($n$) is "0").

The exclusive OR operation unit 106($n$) calculates the exclusive OR of the carry flag information cf outputted from the subtraction operation unit 104($n$) of the own processing element 201($n$) and the carry flag information cf_right that is an inversion of the carry flag information cf outputted from the subtraction operation unit 104($n$+1) of the neighboring processing element 201($n$+1) on the right side, and outputs the result to the add/subtraction operation unit 107($n$).

The add/subtraction operation unit 107($n$) determines whether to execute the adding action or the subtraction action by taking the output from the logical product operation unit 105($n$) as the add/subtraction selection signal. The add/subtraction operation unit 107($n$) performs adding processing of the value of the number-of-data-sets cntr stored in the register 102($n$) and the output value of the exclusive OR operation unit 106($n$) in a case of the adding action (the case where the output result of the logical product operation unit 105($n$) is "1"), and performs subtraction processing of the value of the number-of-data-sets cntr stored in the register 102($n$) and the output value of the exclusive OR operation unit 106 in a case of the subtraction action (the case where the output result of the logical product operation unit 105($n$) is "0"). Then, the add/subtraction operation unit 107($n$) outputs the output value to the register 102($n$) and the RAM 101($n$).

The register 102($n$) uses the operation result of the add/subtraction operation unit 107 as an update instruction signal for updating the content to be stored. Further, the RAM 101($n$) receives a result obtained by adding the operation result of the add/subtraction operation unit 107 and a prescribed base address value, for example, as an access address addr to the RAM 101 in a cycle where the data distribution leveling instruction EQL is executed.

FIG. 3 shows how the output values of the logical product operation unit 105($n$), the exclusive OR operation unit 106($n$), and the add/subtraction operation unit 107($n$) as well as the values of the register (cntr) 102 and the register (md) 103($n$) change in accordance with the combination of the value ("1" or "0") of the carry flag information cf of the own processing element 201($n$) and the value ("1" or "0") of the carry flag information cf_right that is a logic-inversion of the carry flag information cf of the neighboring processing element 201($n$+1) on the right side separately for a case where the write enable signal wen is inputted to the RAM 101($n$) and a case where the access address signal addr is inputted to the RAM 101($n$).

(Regarding Actions)

Next, the action of the SIMD parallel computer system when the data distribution leveling instruction EQL is issued from the control processor 210 will be described by referring to FIG. 2 and FIG. 3. As described above, explanations will be provided by taking the processing element 201($n$) shown in the drawings as the own processing element and the processing element 201($n$−1) or the processing element 201($n$+1) shown in the drawings as the neighboring processing element.

The processing element (n−1) includes the subtraction operation unit (sub) 104($n$−1), the exclusive OR operation unit (xor) 106($n$−1), the logical product operation unit (and) 105($n$−1), the add/subtraction operation unit (add/sub) 107($n$−1), the register (cntr) 102($n$−1) (number-of-data-sets storage unit), the register (md) 103($n$−1) (front data storage unit), and the RAM 101($n$−1).

The processing element (n) includes the subtraction operation unit (sub) 104($n$), the exclusive OR operation unit (xor) 106($n$), the logical product operation unit (and) 105($n$), the add/subtraction operation unit (add/sub) 107($n$), the register (cntr) •102($n$) (number-of-data-sets storage unit), the register (md) 103($n$) (front data storage unit), and the RAM 101($n$).

The processing element (n+1) includes the subtraction operation unit (sub) 104($n$+1), the exclusive OR operation unit (xor) 106($n$+1), the logical product operation unit (and) 105($n$+1), the add/subtraction operation unit (add/sub) 107($n$+1), the register (cntr) 102($n$+1) (number-of-data-sets storage unit), the register (md) 103($n$+1) (front data storage unit), and the RAM 101($n$+1).

The explanations hereinafter are provided by referring to the case of executing the data distribution leveling instruction EQL by assuming that the processing data or the transfer data is moved sequentially from the processing element on the left side of the drawing to the processing element on the right side and the parallel processing is performed thereon.

The control processor 210 (particularly the data distribution leveling instruction generating unit 212) acquires the information of the number-of-data-sets cntr stored in the registers 103 of the entire processing elements that are coupled in a ring form including the processing elements (n−1), (n), and (n−1), when issuing the data distribution leveling instruction EQL for leveling the data distribution. Further, the control processor 210 (particularly the data distribution leveling instruction generating unit 212) controls all the processing elements 201 to repeatedly execute the data distribution leveling instruction EQL by performing following processing, for example. In the case described below, the data distribution leveling instruction generating unit 212 of the control processor 210 acquires the information of the number-of-data-sets cntr stored in the registers 103 of the entire processing elements 201 coupled in a ring form under the control of the execution control unit 214, acquires the result H that is obtained by dividing the total sum of the values of the number-of-data-sets cntr of all the processing elements 201 by the number of the entire processing elements 201, i.e., the average value H of the number-of-data-sets cntr over the entire processing elements 201, and controls the processing element array 200 until the difference between the value of the number-of-data-sets cntr of the entire processing elements 201 and the average value H becomes equal to or less than a threshold value ("1", for example).

Next, described is a case where the processing element 201(n) of the processing element array 200 repeatedly executes the data distribution leveling instruction EQL. When executing the data distribution leveling instruction EQL, the processing elements 201 other than the processing element 201(n) also repeatedly execute the data distribution leveling instruction EQL in the same manner as in the case of the processing element 201(n) described below.

The subtraction operation unit 104(n) of the control processor 210 mounted to the own processing element 201(n) compares the value of the number-of-data-sets cntr stored in the register (cntr) 102(n) of the own processing element (n) with the value of the number-of-data-sets cntr_left stored in the register (cntr) 102(n−1) of the neighboring processing element (n−1) of the own processing element (n) on the left side.

Then, when the value of the number-of-data-sets cntr_left is larger than the value of the number-of-data-sets cntr, for example, i.e., when (the value of the number-of-data-sets cntr_left−the value of the number-of-data-sets cntr) is larger than "0", the subtraction operation unit 104(n) outputs the carry flag information cf in the own processing element (n) as "1".

Inversely, when the value of the number-of-data-sets cntr_left is equal to or smaller than the value of the number-of-data-sets cntr, for example, i.e., when (the value of the number-of-data-sets cntr_left−the value of the number-of-data-sets cntr) is equal to or smaller than "0", the subtraction operation unit 104(n) outputs the carry flag information cf in the own processing element (n) as "0".

Subsequently, the logical product operation unit 105(n) inputs the carry flag information cf of the own processing element (n) and the carry flag information cf_right that is inversion of the carry flag information cf of the neighboring processing element (n+1) on the left side, and performs logical product processing on those values. As shown in FIG. 3, the output of the logical product operation unit 105(n) is "1" only when the carry flag information cf is "1" and the carry flag information cf_right is "0". The logical product operation unit 105(n) outputs the result of the logical product processing to the add/subtraction operation unit 107(n) and the RAM 101(n).

The RAM 101(n) receives the output of the logical product operation unit 105(n) as a write enable signal wen, when the output value from the logical product operation unit 105(n) is "1". Then, the RAM 101(n) comes in a state where writing of the data is permitted.

Thus, the RAM 101(n) writes the front data md_left stored in the register (md) 103(n−1) of the neighboring processing element (n−1) on the left side as input data din of the RAM 101(n).

As a result, the RAM 101(n) comes to have the data that includes, in addition to the currently existing data, the front data md_left that is stored in the register 103(n−1) of the neighboring processing element (n−1) on the left side.

The exclusive OR operation unit 106(n) inputs the carry flag information cf on the own processing element (n) and the carry flag information cf_right of the neighboring processing element (n+1) on the right side. As shown in FIG. 3, the output of the exclusive OR operation unit 106(n) is "0" when the carry flag information cf and the carry flag information cf_right are of the same logic, and the output of the exclusive OR operation unit 106(n) is "1" when the carry flag information cf and the carry flag information cf_right are of different logics.

Then, the add/subtraction operation unit 107(n) determines whether to perform the adding operation or the subtraction operation based on the output value of the logical product operation unit 105. For example, as shown in FIG. 3, when the output value of the logical product operation unit 105 is "1", the add/subtraction operation unit 107(n) determines to perform the adding operation "+". In the meantime, when the output value of the logical product operation unit 105 is "0", the add/subtraction operation unit 107(n) determines to perform the subtraction operation "−".

Thus, as shown in FIG. 2, when the output value of the logical product operation unit 105 is "1", the add/subtraction operation unit 107(n) performs adding processing of the value of the number-of-data-sets cntr stored in the register (cntr) 102(n) and the output value of the exclusive OR operation unit 106(n). In the meantime, when the output value of the logical product operation unit 105 is "0", the add/subtraction operation unit 107(n) performs subtraction processing of the value of the number-of-data-sets cntr stored in the register (cntr) 102(n) and the output value of the exclusive OR operation unit 106(n).

Then, the add/subtraction operation unit 107(n) outputs the output value of the add/subtraction operation unit 107(n) as the operation result to the register (cntr) 102(n). Further, the add/subtraction operation unit 107 outputs a memory address operation result that is obtained by adding the output value of the add/subtraction operation unit 107(n) as the operation result and a prescribed base address value to the RAM 101(n) as the access address addr to the RAM 101(n) in this cycle (a memory address generating function).

For example, when the output value of the logical product operation unit 105 is "1" and the output value of the exclusive OR operation unit 106(n) is "1", the register 102(n) increments the value of the number-of-data-sets cntr stored currently by 1 based on the output of the add/subtraction operation unit 107(n), and updates the stored number of data sets to "cntr+1".

When the output value of the logical product operation unit 105 is "0" and the output value of the exclusive OR operation unit 106(n) is "1", the register 102(n) decrements the value of the number-of-data-sets cntr stored currently by 1 based on the output of the add/subtraction operation unit 107(n), and updates the stored number of data sets to "cntr−1".

When the output value of the logical product operation unit 105 is "0" and the output value of the exclusive OR operation unit 106(n) is "0", the register 102(n) keeps the value of the number-of-data-sets cntr stored currently based on the output of the add/subtraction operation unit 107(n).

As a result, as shown in FIG. 3, the values of the register (cntr) 102(n) become "cntr", "cntr+1", and "cntr−1", respectively.

That is, when the carry flag information cf of the own processing element (n) and the carry flag information cf_right of the neighboring processing element (n+1) on the right side are of different logics and cf is "1" (the number of data sets of the neighboring processing element (n−1) on the left side is greater than the number of data sets of the own processing element (n)), the register (cntr) 102(n) updates the number of data sets to the number of data sets "cntr+1" that is the value obtained by incrementing the number of data sets cntr stored currently by 1.

In the meantime, when the carry flag information cf of the own processing element (n) and the carry flag information cf_right of the neighboring processing element (n+1) on the right side are of different logics and cf is "0" (the number of data sets of the neighboring processing element (n−1) on the left side is equal to or less than the number of data sets of the own processing element (n)), the register (cntr) 102(n) updates the number of data sets to the number of data sets "cntr−1" that is the value obtained by decrementing the number of data sets stored currently by 1.

Further, when the carry flag information cf of the own processing element (n) and the carry flag information cf_right of the neighboring processing element (n+1) on the right side are of a same logic, e.g., in a case where the number of data sets of the neighboring processing element (n−1) on the left>the number of data sets of the own processing element (n)>the number of data sets of the neighboring processing element (n+1) on the right side, a case where the number of data sets of the neighboring processing element (n−1) on the left side≤the number of data sets of the own processing element (n)≤the number of data sets of the neighboring processing element (n+1) on the right side, and the like, the register (cntr) 102(n) keeps the currently stored value of the number-of-data-sets cntr.

Further, based on the carry flag information cf of the PE(n), either the front data md_left of the register (md) 103(n−1) of the neighboring processing element (n−1) on the left side or the front data dout (the front data of the data within the RAM 101(n) before data is inputted from din) in the prior cycle outputted from the RAM 101(n) of the own processing element (n) is inputted to the register (md) 103(n), and the register 103(n) updates the data based on the input data.

That is, when the carry flag information cf of the own processing element (n) is "1", the register (md) 103(n) updates the currently stored front data md to the front data md_left. When the carry flag information cf of the own processing element (n) is "0", the register (md) 103(n) updates the currently stored front data md to the next data following the front data stored in the RAM 101(n).

Thus, as shown in FIG. 3, the value of the register (md) 103(n) becomes md_left when the carry flag information cf of the PE(n) is "1", and becomes dout when the carry flag information cf of the PE(n) is "0".

Further, when the output value of the logical product operation unit 105 is "1", the write enable signal wen becomes "1". Thus, the front data md_left of the register (md) 103(n−1) of the neighboring processing element (n−1) on the left side is inputted as the input data din of the RAM 101(n), and written to the storage region that corresponds to the access address addr (the prescribed base address value+cntr+1).

As a result, within the storage region of the RAM 101(n), the currently existing data is stored in the storage region from the point where the access address addr is the prescribed base address to the (prescribed base address+cntr), while the front data md_left of the neighboring processing element (n−1) on the left side is stored in the storage region where the access address addr is the (prescribed base address+cntr+1).

At this time, the carry flag information cf of the own processing element (n) is "1", so that only md_left is inputted to the register (md) 103(n).

In the meantime, the case where the output value of the logical product operation unit 105 is "0" and the output value of the exclusive OR operation unit 106(n) is "1" is a case where the carry flag information cf of the own processing element (n) is "0" and the carry flag information cf_right of the neighboring processing element (n+1) on the right side is "1". For example, there is assumed a case where the number of data sets of the neighboring processing element (n−1) on the left side>the number of data sets of the own processing element (n)≤the number of data sets of the neighboring processing element (n+1) on the right side.

In that case, the value of the register (cntr) 102(n) is updated from "cntr" to "cntr−1". Further, the value of the register (md) 103(n) is updated by receiving the input of the front data dout from the RAM 101(n), since the carry flag information cf of the PE(n) is "0". Thus, the data obtained by excluding the front data from the currently existing data is stored inside the RAM 101(n).

On the other hand, as the case where the output value of the logical product operation unit 105 is "0", the output value of the exclusive OR operation unit 106(n) is "0", the carry flag information cf of the own processing element (n) is "0", and the carry flag information cf_right of the neighboring processing element (n+1) on the right side is "0", there is assumed a case where the number of data sets of the neighboring processing element (n−1) on the left side≤the number of data sets of the own processing element (n)≤the number of data sets of the neighboring processing element (n+1) on the right side.

In that case, the value of the register (cntr) 102(n) is not updated but remained as "cntr". Further, the value of the register (md) 103(n) is not updated, since the carry flag information cf of the PE(n) is "0".

As the case where the output value of the logical product operation unit 105 is "0", the output value of the exclusive OR operation unit 106(n) is "0", the carry flag information cf of the own processing element (n) is "1", and the carry flag information cf_right of the neighboring processing element (n+1) on the right is "1", there is assumed a case where the number of data sets of the neighboring processing element (n−1) on the left side>the number of data sets of the own processing element (n)>the number of data sets of the neighboring processing element (n+1) on the right side, for example.

In that case, the value of the register (cntr) 102(n) is not updated but remained as "cntr". Further, the value of the register (md) 103(n) is updated by receiving the input of the front data md_left of the neighboring processing element (n−1) on the left side, since the carry flag information cf of the own processing element (n) is "1".

As described, the control processor 210 compares the value of the number-of-data-sets cntr_left of the neighboring processing element on the left side with the value of the number-of-data-sets cntr of the own processing element, and calculates the carry flag information cf "1" when the former is larger than the latter and calculates the carry flag information cf "0" if not. The control processor 210 collectively updates the number-of-data-sets cntr of the own processing element, the front data md out of the data stored in the RAM of the own processing element, and the contents of the processing data or the transfer data stored in the RAM of all the processing elements according to the control rules (a)-(d) below that are determined by the calculated carry flag information and the carry flag information cf_right that is obtained by logic-inverting the carry flag information cf of the neighboring processing element on the right side. Thereby, the control processor 210 simultaneously compares the number of data sets of the own processing element and the number of data sets of the neighboring processing element on the left side, and controls all the processing elements to execute the processing action for moving the processing data or the transfer data of the neighboring processing element on the left side to the own processing element, when the number of data sets of the neighboring processing element on the left side is greater.

(a) When the carry flag information cf of the own processing element is "0" and the carry flag information cf_right that is obtained by logic-inverting the carry flag information of the neighboring processing element on the right side is "0", the content of the number-of-data-sets cntr of the register 102 as the number-of-data-sets storage module of the own processing element and the content stored in the register 103 as the data storage module are not updated.

(b) When the carry flag information cf of the own processing element is "0" and the carry flag information cf_right that is obtained by logic-inverting the carry flag information of the neighboring processing element on the right side is "1", the number-of-data-sets cntr of the register 102 as the number-of-data-sets storage module of the own processing element is decremented by 1 and the content stored in the register 103 as the data storage module is updated to next processing data or transfer data following the front data.

(c) When the carry flag information cf of the own processing element is "1" and the carry flag information cf_right that is obtained by logic-inverting the carry flag information of the neighboring processing element on the right is "0", the number-of-data-sets cntr of the register 102 as the number-of-data-sets storage module of the own processing element is incremented by 1 and the front data of the processing data or the transfer data stored in the register 103 as the data storage module is updated to the front data that is stored in the register 103 as the data storage module of the neighboring processing element on the left side.

(d) When the carry flag information cf of the own processing element is "1" and the carry flag information cf_right that is obtained by logic-inverting the carry flag information of the neighboring processing element on the right is "1", the number-of-data-sets cntr of the register 102 as the number-of-data-sets storage module of the own processing element is not updated. The front data of the processing data or the transfer data stored in the register 103 as the data storage module is updated to the front data that is stored in the register 103 as the data storage module of the neighboring processing element on the left side.

As described above, through having the EQL instruction, the control processor 210 acquires the result H that is obtained by dividing the total sum of the values of the number-of-data-sets cntr to be processed by the entire processing elements with the number of the entire processing elements, for example, (i.e., the average value H of the values of the number-of-data-sets cntr over the entire processing elements), and controls the processing element array 200 to repeat the EQL instruction until the difference between the value of the number-of-data-sets cntr to be processed by the entire processing elements and the average value H becomes a value equal to or less than a values that is smaller than a threshold value ("1", for example). Thereby, the control processor 210 can level the processing data or the transfer data of the entire processing elements almost to be the same number through controlling the processing element array 200 to execute the EQL instructions for the number of times about the same as the sum of the entire processing elements and the difference between the maximum value of the number-of-data-sets cntr to be processed by the processing elements and the minimum value of the number-of-data-sets cntr to be processed by the processing elements.

In the above, the embodiment is described by referring to the case where the subtraction operation (sub) 104, the exclusive OR operation unit (xor) 106, the logical product operation unit (and) 105, and the add/subtraction operation unit (add/sub) 107 constituting the control processor 210 mounted to each of the processing elements 201 are built as hardware. However, the present invention is not limited only to that. The present invention may also be built as a control program which implements a function of the subtraction operation (sub) 104, a function of the exclusive OR operation unit (xor) 106, a function of the logical product operation unit (and) 105, and a function of the add/subtraction operation unit (add/sub) 107 on software by causing a computer (microprocessor) to execute application software.

Note here that the processing element can be structured as a leveling processing device with the embodiment. In that case, the leveling processing device is controlled by a control processor, and can be structured as a plurality of processing elements used in a parallel computer system that includes the control processor.

The RAM as the data storage unit can temporarily store the processing data or the external memory transfer data. The register (cntr) as the number-of-data-sets storage unit can count and temporarily store the number of data in the data storage unit. The register (md) as the front data storage unit can temporarily store the front data out of the data in the data storage unit.

The leveling processing unit operates according to the data distribution leveling instruction from the control processor, and it is capable of performing the leveling processing for the data in the data storage unit by respectively controlling the data storage unit, the number-of-data-sets storage unit, and the front data storage unit based on first comparison result information obtained by comparing the first number of data sets of the own processing element with the second number of data sets of a first neighboring processing element that is one of the processing elements neighboring to the own processing element and second comparison result information that is a comparison result with respect to a second neighboring processing element that is the other neighboring processing element (or according to the control rules (a)-(d) determined based on the first and second comparison result information).

Further, the leveling processing unit can include: a comparing unit which calculates the first comparison result information obtained by comparing the first number of data sets of the own processing element with the second number of data sets of the first neighboring processing element that is one of the processing elements neighboring to the own processing element; the exclusive OR operation unit which calculates exclusive OR information between the second comparison result information that is the comparison result with respect to the second neighboring processing element that is the other neighboring processing element and the first comparison result information; the logic product operation unit which calculates the logic product information between the logic-inverted information of the second comparison result information and the first comparison result information; and the add/subtraction operation unit which controls to select either the adding operation or the subtraction operation of the first number of data and the exclusive OR information based on the logic product information, and calculates the add/subtraction operation information that is the result of one of the operations.

As described above, the "data distribution leveling instruction EQL" can be implemented with a simple and less-calculation combination with the embodiment, so that it can be loaded in a single machine cycle. Therefore, the processing for leveling the number-of-data-sets can be implemented efficiently while suppressing the increase in the hardware cost to be small.

That is, the "data distribution leveling instruction EQL" can be implemented with a simple and less-calculation combination with the SIMD parallel computer system of such structure, so that it can be loaded in a single machine cycle. In the meantime, it takes about ten machine cycles for the SIMD parallel computer system having no EQL instruction disclosed in Non-Patent Document 1, for example, to perform the processing corresponding to the EQL instruction.

Therefore, the SIMD parallel computer system having the "data distribution leveling instruction EQL" according to the embodiment of the present invention can efficiently implement the processing for leveling the number-of-data-sets while suppressing the increase in the hardware cost to be small.

Further, the numerical values showing the data amount are not communicated between the processing elements, and it is unnecessary to perform scheduling therebetween. Furthermore, the data amount leveling processing can be achieved efficiently between the PEs only with small additional hardware cost.

Second Embodiment

Next, a second embodiment of the present invention will be described by referring to FIG. 4-FIG. 6. Hereinafter, explanations of the structures that are substantially the same as those of the first embodiment are omitted, and only different points are to be described.

Figure 4:
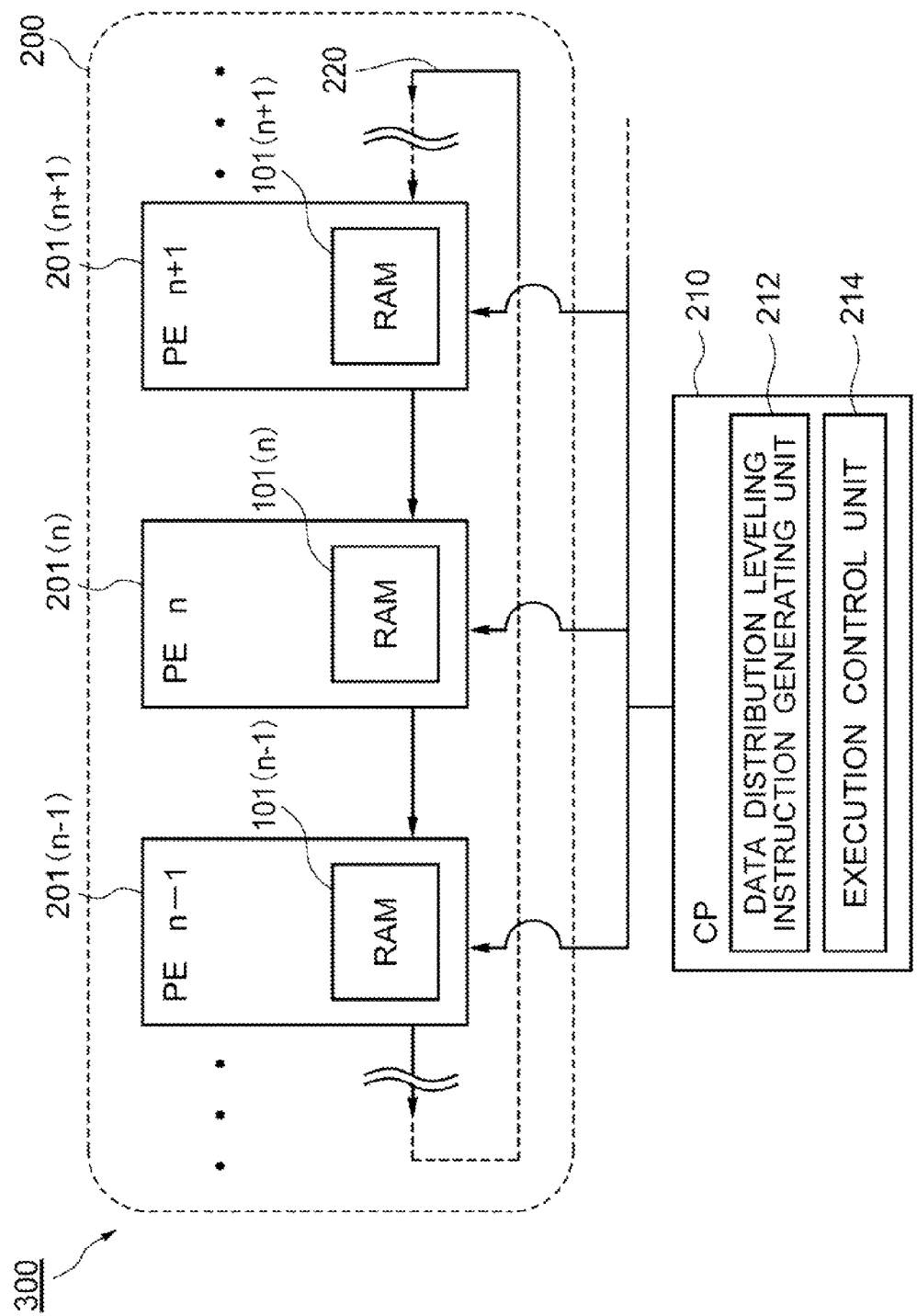
FIG. 4 is a block diagram showing an example of a schematic structure of an entire SIMD parallel computer system according to a second embodiment of the present invention.

The only difference between an SIMD parallel computer system 300 according to this embodiment and that of the first embodiment is that the data such as the processing data or the transfer data is moved between the PEs from the left to right direction every time the EQL instruction is executed in the first embodiment (FIG. 1), while the data such as the processing data or the transfer data is moved between the processing elements from the right to left direction every time the EQL instruction is executed in the second embodiment (FIG. 4).

Figure 5:
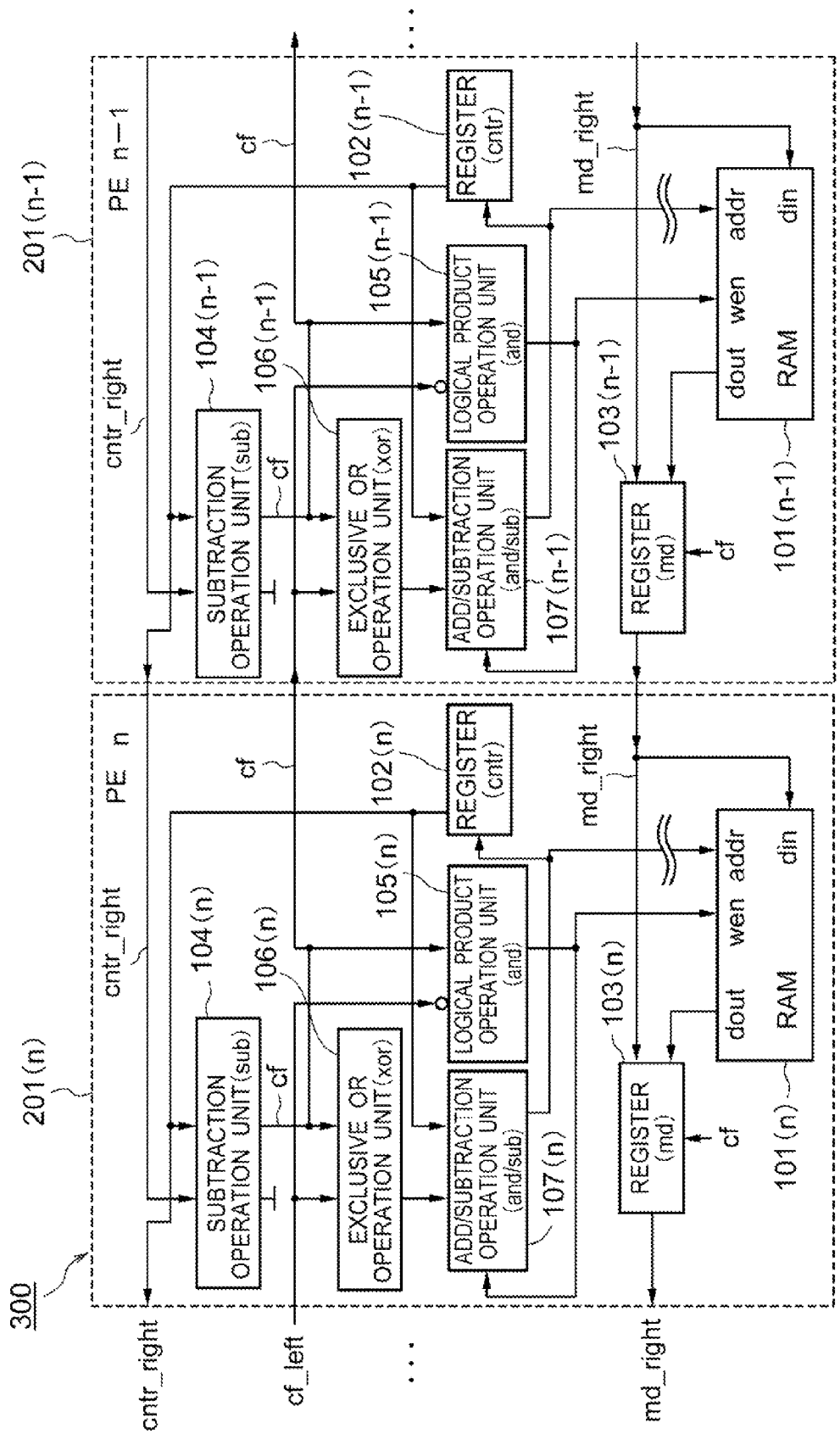
FIG. 5 is a block diagram showing a detailed structure of PE of the SIMD parallel computer system shown in FIG. 4.

Referring to FIG. 5, the SIMD parallel computer system 300 according to the second embodiment executes the EQL instruction to use the carry flag information cf_left that is obtained by logic-inverting the carry flag information cf of the neighboring processing element on the left side instead of the carry flag information cf_right, to use the number-of-data-sets cntr_right showing the number-of-data-sets cntr of the neighboring processing element on the right instead of the number-of-data-sets cntr_left of the neighboring processing element on the left side, and to use the front data md_right showing the front data md stored in the register 103 that is the number-of-data-sets storage module of the neighboring processing element on the right side instead of the front data md_left showing the front data md stored in the register 103 that is the number-of-data-sets storage module of the neighboring processing element on the left side, while each processing element of the first embodiment at the time of executing the EQL instruction uses the carry flag information cf_right that is obtained by logic-inverting the carry flag information cf of the neighboring processing element on the right side, the number-of-data-sets cntr_left showing the number-of-data-sets cntr of the neighboring processing element on the left side, and the front data md_left showing the front data md stored in the register 103 that is the number-of-data-sets storage module of the neighboring processing element on the left side.

As described above, the control processor 210 compares the value of the number-of-data-sets cntr_left of the neighboring processing element on the right side with the value of the number-of-data-sets cntr of the own processing element, and calculates the carry flag information cf "1" when the former is larger than the latter and calculates the carry flag information cf "0" if not. The control processor 210 collectively updates the number-of-data-sets cntr of the own processing element, the front data and out of the data stored in the RAM of the own processing element, and the contents of the processing data or the transfer data stored in the RAM of all the processing elements according to the control rules (a)-(d) below that are determined by the calculated carry flag information cf and the carry flag information cf_left that is obtained by logic-inverting the carry flag information cf of the neighboring processing element on the right side. Thereby, the control processor 210 simultaneously compares the number of data sets of the own processing element with the number of data sets of the neighboring processing element on the left side, and controls all the processing elements to execute the processing action for moving the processing data or the transfer data of the neighboring processing element on the left side to the own processing element, when the number of data sets of the neighboring processing element on the left side is greater.

(a) When the carry flag information cf of the own processing element is "0" and the carry flag information cf_left that is obtained by logic-inverting the carry flag information of the neighboring processing element on the left side is "0", the content of the number-of-data-sets cntr of the register 102 as the number-of-data-sets storage module of the own processing element and the content stored in the register 103 as the data storage module are not updated.

(b) When the carry flag information cf of the own processing element is "0" and the carry flag information cf_left that is obtained by logic-inverting the carry flag information of the neighboring processing element on the left side is "1", the number-of-data-sets cntr of the register 102 as the number-of-data-sets storage module of the own processing element is decremented by 1 and the content stored in the register 103 as the data storage module is updated to next processing data or transfer data following the front data.

(c) When the carry flag information cf of the own processing element is "1" and the carry flag information cf_right that is obtained by logic-inverting the carry flag information of the neighboring processing element on the left side is "0", the number-of-data-sets cntr of the register 102 as the number-of-data-sets storage module of the own processing element is incremented by 1 and the front data of the processing data or the transfer data stored in the register 103 as the data storage module is updated to the front data that is stored in the register 103 as the data storage module of the neighboring processing element on the right side.

(d) When the carry flag information cf of the own processing element is "1" and the carry flag information cf_right that is obtained by logic-inverting the carry flag information of the neighboring processing element on the left side is "1", the number-of-data-sets cntr of the register 102 as the number-of-data-sets storage module of the own processing element is not updated. The front data of the processing data or the transfer data stored in the register 103 as the data storage module is updated to the front data that is stored in the register 103 as the data storage module of the neighboring processing element on the right side.

As described above, through having the EQL instruction, the control processor 210 acquires the result H that is obtained by dividing the total sum of the values of the number-of-data-sets cntr to be processed by the entire processing elements with the number of the entire processing elements, for example, (i.e., the average value H of the values of the number-of-data-sets cntr over the entire processing elements), and controls the processing element array 200 to repeat the EQL instruction until the difference between the value of the number-of-data-sets cntr to be processed by the entire processing elements and the average value H becomes a value equal to or less than a value that is smaller than a threshold value ("1", for example). Thereby, the control processor 210 can level the processing data or the transfer data of the entire processing elements almost to be the same number through controlling the processing element array 200 to execute the EQL instructions for the number of times about the same as the sum of the entire processing elements and the difference between the maximum value of the number-of-data-sets cntr to be processed by the processing elements and the minimum value of the number-of-data-sets cntr to be processed by the processing elements.

Other structures, other steps, functions, and working effects thereof are the same as those of the embodiment described above. Further, the operation contents of each of the steps, the structural elements of each unit, and each of the functions thereof described in the above explanations may be put into a program to have it executed by a computer.

In the first and second embodiments described above, a case that requires the register (md) 103 for storing the front data out of the processing data or the transfer data is a case that uses a synchronous RAM or the like, in which a readout address supplying cycle and a readout data useable cycle are shifted by one cycle, as the RAM 101 that is accessible by each processing individually.

In a case where a register is used as the RAM 101, the readout address supplying cycle and the readout data useable cycle can be a same cycle. Thus, the register (md) 103 is unnecessary, and the register holding the front data of the RAM 101 itself may simply be used as the register (md) 103.

Third Embodiment

Next, a case that describes the first embodiment of the present invention by referring to a more concretive example will be discussed as a third embodiment of the present invention by referring to FIG. 7 and FIG. 8. Therefore, the structures of the third embodiment of the present invention are the same as those shown in FIG. 1 and FIG. 2, so that explanations of the structures are omitted.

In order to explain the third embodiment of the present invention, in FIG. 7, the number of the processing elements 201 constituting the processing element array 200 is set as "8", and reference numerals from PE0 to PE7 are applied to the processing elements 201 for discriminating each of the processing elements. Further, in the initial state of each of the processing elements PE0-PE7, it is assumed that initial values of number-of-data-sets cntr stored in the registers 102 of the processing elements PE0-PE7 are 3, 2, 1, 5, 0, 1, 4, 1, and the total sum of the value of number-of-data-sets cntr stored in the registers 102 of the entire processing elements PE0-PE7 is "17". Furthermore, it is assumed that the front data and out of the data stored in each of the RAMs 101 is already being stored in the registers 103 of the entire processing elements PE0-PE7.

Under the above-described setting, the control processor 210 acquires the information of the number-of-data-sets stored in the registers 102 of each of the processing elements PE0-PE7 coupled in a ring form, acquires the result H (2.125) that is obtained by dividing the total sum "17" of the values of the number-of-data-sets cntr of all the processing elements PE0-PE7 by the number "8" of the entire processing elements PE0-PE7, i.e., the average value H (2.125) of the number-of-data-sets cntr over the entire processing elements PE0-PE7, and controls the processing element array 200 until the difference between the value of the number-of-data-sets cntr of the entire processing elements PE0-PE7 and the average value H becomes equal to or less than a threshold value ("1" in this case).

The third embodiment of the present invention corresponds to the first embodiment of the present invention. Thus, when it is assumed in a case of executing the EQL instruction that the own processing element 201(n) is the processing element PE1, for example, the neighboring processing element 201(n−1) on the left side is the processing element PE0, and the neighboring processing element 201(n+1) on the right side is the processing element PE2. Hereinafter, described is an action of a case where the control processor 210 repeatedly issues the EQL instruction for moving the processing data in the direction from the neighboring processing element on the left side of the drawing to the neighboring processing element on the right side to the processing array.

When the control processor 210 executes the EQL instruction under a condition of step 0 shown in FIG. 7, the processing data is moved from the neighboring processing element on the left side to the neighboring element on the right side. As a result, data is moved between the processing elements i.e., from the neighboring processing element on the left side with the larger number-of-data-sets cntr stored in the register 102 to the own processing element with the value of, the number-of-data-sets stored in the register 102 smaller than that. That is, in the case of FIG. 7, one-piece each of data is moved in the direction of the processing element PE0→the processing element PE1, the processing element PE1→the processing element PE2, the processing element PE3→the processing element PE4, and the processing element PE6→the processing element PE7, and the values of the number-of-data-sets cntr stored in the registers 102 of the processing elements PE0-PE7 become 2, 22, 4, 1, 1, 3, and 2, respectively, and the execution state of the EQL instruction is shifted to the state of step 1 in FIG. 7.

The control processor 210 acquires the values of the number-of-data-sets cntr stored in the registers 102 of each of the processing elements PE0-PE7, judges whether or not the total number of data sets cntr are uniformly distributed to all the processing elements PE0-PE7, and issues the EQL instruction again when the distributed numbers of data sets are not uniform. When the control processor 210 issues the EQL instruction three times in total, for example, to the processing array, the EQL instruction mutually between each of the processing elements as described in step 1 of FIG. 7 is executed, and the execution state of the EQL instruction is shifted as step 1→step 2→step 3 shown in FIG. 7. In the state of step 3 shown in FIG. 7, the values of the number-of-data-sets cntr stored in the registers 102 of each of the processing elements PE0-PE7 become 3, 2, 2, 2, 2, 2, 2, and 2, respectively.

The control processor 210 acquires the values of the number-of-data-sets cntr stored in the registers 102 of each of the processing elements PE0-PE7 in step 3 of FIG. 7, judges whether or not the total number-of-data-sets cntr are uniformly distributed to all the processing elements PE0-PE7. In step 3 of FIG. 7, the total number-of-data-sets cntr is distributed uniformly to all the processing elements PE0-PE7, so that the difference between the number-of-data-sets cntr stored in the registers 102 of the entire processing elements PE0-PE7 and the calculated average value H becomes equal to or less than 1. Therefore, the control processor 210 detects that state, and controls the processing element array (PE0-PE7) to extricate from the loop of issuing the EQL instruction.

Fourth Embodiment

In the first to third embodiments described above, the subtraction operation unit (sub) 104, the exclusive OR operation unit (xor) 106, the logical product operation unit (and) 105, and the add/subtraction operation unit (add/sub) 107 constituting the control processor mounted each processing element 201 for performing processing for issuing the EQL instruction are built as hardware. However, the present invention is not limited only to such case. That is, the present invention may also be built as a control program which implements a function of the subtraction operation (sub) 104, a function of the exclusive OR operation unit (xor) 106, a function of the logical product operation unit (and) 105, and a function of the add/subtraction operation unit (add/sub) 107 on software by causing a computer (microprocessor) to execute application software.

Further, as the structural elements constituting the control processor 210, the subtraction operation unit (sub) 104, the exclusive OR operation unit (xor) 106, the logical product operation unit (and), and the add/subtraction operation unit (add/sub) 107 which are the structural elements required for executing the EQL instruction have been described by referring to the drawings. However, the structural elements are not limited only to those. In addition to those, a function call instruction generating unit for executing a function call instruction CALL I, a dividing action designation instruction generating unit for executing an instruction CDIV, a register-value transfer instruction generating unit for executing an instruction MVCP, a subtraction result absolute value calculation instruction generating unit for executing an instruction ASUB, a subtraction result calculation instruction generating unit for executing an instruction SUB, a conditional flag OR calculation instruction generating unit for executing an instruction STS, and a condition divergence instruction generating unit for executing a condition divergence instruction BRM may be added. The added structural elements are embodiments of the data distribution leveling instruction generating unit 212 and the execution control unit 214 shown in FIG. 1.

In the explanation below, described is a case where the function of the control processor 210, in which the above-described structural elements (212, 214) for executing the various kinds of instructions are added to the structural elements (104-107) for executing the EQL instruction, is built as a control program implemented on software by having a computer (microprocessor) execute application software.

As shown in FIG. 8, the control program for executing the functions of the control processor 210 of the SIMD parallel computer system according to the embodiment is built by including the followings, in addition to the EQL instruction that is one instruction out of the instruction set of the data distribution leveling action.

(A) Function call instruction CALL I (built as the function call instruction generating unit in case of hardware)

(B) Instruction CDIV for designating a dividing action on the control processor 210 (built as the dividing action designation instruction generating unit in case of hardware)

(C) Instruction MVCP for transferring a register value on CP designated by a first operand to registers on the all PEs designated by second operand (built as the register-value transfer instruction generating unit in case of hardware)

(D) Instruction ASUB for designating an action of calculating the absolute value of the subtraction result between the register value designated by the first operand and the register value designated by the second operand on PE, and storing it to the register designated by third operand (built as the subtraction result absolute value calculation instruction generating unit in case of hardware)

(E) Instruction SUB for designating an action of performing subtraction between the register value designated by the first operand and the register value designated by the second operand on PE, and storing the result to the register designated by the third operand (built as the subtraction result calculation instruction generating unit in case of hardware)

(F) Instruction STS for designating an action of storing 1-bit information acquired as OR over the entire PEs of the conditional flag values on PE of the type designated by the first operand to a mask register on CP (built as the conditional flag OR calculation instruction generating unit in case of hardware)

(G) Condition divergence instruction BRM for designating an action to perform divergence when the value of the mask register on CP is "1" and not to perform divergence when the value is "0" (built as the condition divergence instruction generating unit in case of hardware)

In descriptions of the contents of the control program in FIG. 8, description of "- - -" means to designate that the neighboring instructions on both sides are executed in a same cycle. Further, a part surrounded by /* and /* is a comment.

Further, a character string ended with ":" shows a lot number of an appearing position of that character string. In a case where a same label is designated as the operand of the divergence instruction, it means to designate the same lot number.

"*Lot-number A*/CALLI Fadd_allpe cntr" that is a function call instruction CALLI of the control program is to call a function add_allpe, obtain the total sum of the numbers of data sets cntr stored in the registers 102 of the entire processing 201, and stores the total sum to a register r0 as a return value of the function (step S101) <entire PE number-of-data-sets total sum calculation processing step or entire PE number-of-data-sets total sum calculation processing function>.

"* Lot-number A+1*/CDIV r0, PENO, H" that is an instruction CDIV of the control program designates an action of dividing the total sum of the number-of-data-sets cntr being stored in the register r0 with a constant PENO showing the information of the placed number of the processing elements, and storing the result thereof to a register H as the average value H (step S102) <entire PE number-of-data-sets average value calculation processing step or entire PE number-of-data-sets average value calculation processing function>.

"* Lot-number A+2*/MVCP H, h" that is an instruction MVCP of the control program designates an action of transferring the value of the average value H of the number of data sets to the registers 102 of each of the processing elements 201 (step S103) <average value transfer processing or average value transfer processing function>.

Each of "* lot-number A+3*/EQL" as an EQL instruction, "* lot-number A+4*/ASUB h, cntr, tmp" as an ASUB instruction, "* lot-number A+5*/EQL" as an EQL instruction, "* lot-number A+6*/SUB 1, tmp, tmp" as an SUB instruction, "* lot-number A+7*/EQL" as an EQL instruction, and "* lot-number A+8*/STS % S" as an STS instruction is executed in a same cycle.

In a loop of /* lot-number A+3*/~/* lot-number A+10*/ (step S110) <execution control step or execution control function>, while repeatedly issuing the EQL instruction four times in total in each repeat (step S111, step S113, step S115, step S118), the ASUB instruction is issued on each processing element simultaneously with issuing of the first EQL instruction in step S111<the subtraction result absolute value calculation step or the subtraction result absolute value calculation function> and the SUB instruction is issued on each processing element simultaneously with issuing of the second EQL instruction in step S113<the subtraction result calculation step or the subtraction result calculation function> so as to judge whether or not the difference between the value of the number-of-data-sets cntr of the registers 102 of each processing element and the value of the average value H becomes equal to or less than "1" that is the threshold value (step S112, step S114).

Further, the STS instruction is issued simultaneously with issuing of the third EQL instruction in step S115 to store the OR of the values of the conditional flags showing the judgment results over the entire processing elements in the mask register of the control processor 210<the conditional flag OR calculation step or the conditional flag OR calculation function>. In a case where there still remains a processing element whose OR exceeds "1", i.e., whose difference between the value of the number-of-data-sets cntr and the value of the average value H exceeds "1", divergence is performed when executing the BRM instruction of /* lot-number A+9*/ (step S117) <the condition divergence instruction issuing step or the condition divergence instruction issuing function>, and not the instruction of /* lot-number A+11*/ but the instruction of /* lot-number A+3*/ is executed in a next cycle.

In the meantime, when there is no more processing element whose OR is "0", i.e., whose difference between the value of the number-of-data-sets cntr and the average value H exceeds "1", it is shifted to the instruction of /* lot-number A+11*/ without executing divergence to extricate from the loop of the data distribution leveling processing.

With the embodiment as described above, the EQL instruction can be issued in every cycle even during execution of the loop end judgment. Thus, the end judgment processing by the CP for extricating from the loop of repeating the EQL instructions can be made to give only the minimum influence to the entire processing cycle number.

In the meantime, a case of leveling the data distributions through successive judgments done by the CP can be described as follows in regards to the case shown in FIG. 7. It is necessary to successively perform a series of following actions for all the processing elements. First, the value of the number-of-data-sets cntr of the processing element PE0 is read out and compared with the average value H. When it is larger than the average value H, the processing element PE1 or another processing element PE whose number-of-data-sets value cntr is still smaller is selected further, and the data of the processing element PE0 is read out and stored in the RAM 101 of the selected processing element PE. Then, the value of the number-of-data-sets cntr of the processing element PE is incremented by 1, and the value of the number-of-data-sets cntr of the processing element PE0 is decremented by 1. Therefore, it can be easily imagined that an extremely greater number of processing cycles are required compared to the embodiment shown in FIG. 7.

However, the fourth embodiment exhibits following effects. That is, in a case where the leveling of data distributions is to be achieved not by a method of performing the successive judgment by the control processor done by the SIMD parallel computer device that does not include the EQL instruction in the instruction set but by a parallel processing action executed in the processing element array, it is necessary to implement the action corresponding to the action designated by the EQL instruction with the existing instruction combination. In order to do so, ten times or more processing cycles are required compared to the case that includes the EQL instruction. In the meantime, even though it is expected that the processing cycle requires more time with the embodiment as described above since it includes the EQL instruction set, much faster data distribution leveling processing can be achieved compared to the method of the related technique that has no EQL instruction set.

Further, in a case of having processors of P1-P16, for example, it is necessary with Patent Document 1 to repeatedly obtain the averages such as the average of P1 and P2, the average of P1 and P3, the average of P1 and P9, the average of P1 and P5, etc. When the number of processors is increased, it is necessary to calculate the averages between each of the processors, so that it takes more time in simulations and scheduling.

Furthermore, Patent Document 1 employs a method that obtains the averages of P1-P16 by each processor, and it is not a method with which the control processor that controls the entire processors P1-P16 obtains the averages. Thus, each of the processors cannot be controlled as a whole, and the averages of the entire processors P1-P16 cannot be obtained collectively.

In the meantime, it is possible with the embodiment to implement the data distribution leveling processing much faster than that of the method of the related technique.

Other structures, other steps, functions, and working effects thereof are the same as those of the embodiment described above. Further, the operation contents of each of the steps, the structural elements of each unit, and each of the functions thereof described above in the explanations may be put into a program to have it executed by a computer.

Fifth Embodiment

Figure 9:
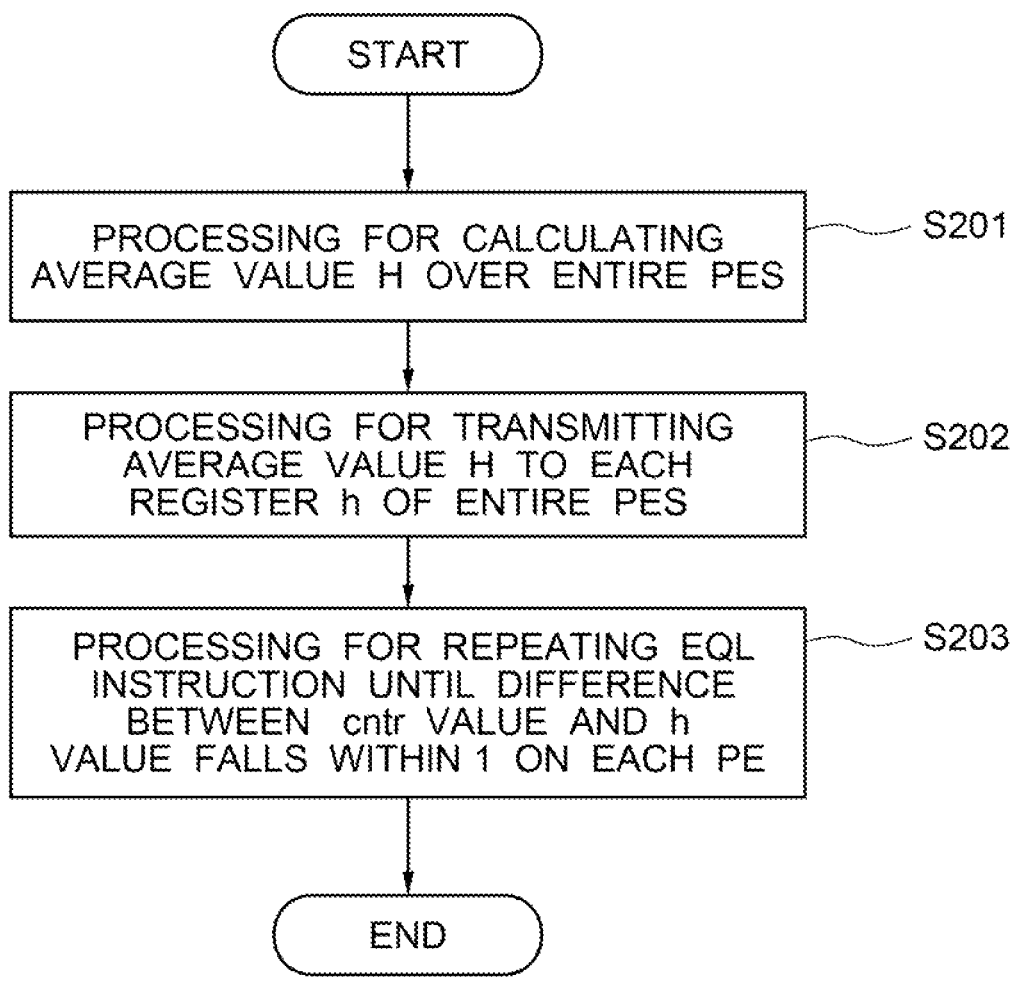
FIG. 9 is a flowchart showing an example of various kinds of processing orders executed in an SIMD parallel computer system according to a fourth embodiment of the present invention.

Next, a fifth embodiment of the present invention will be described by referring to FIG. 9. Hereinafter, explanations of the structures that are substantially the same as those of the first embodiment are omitted, and only different points are to be described.

Figure 10:
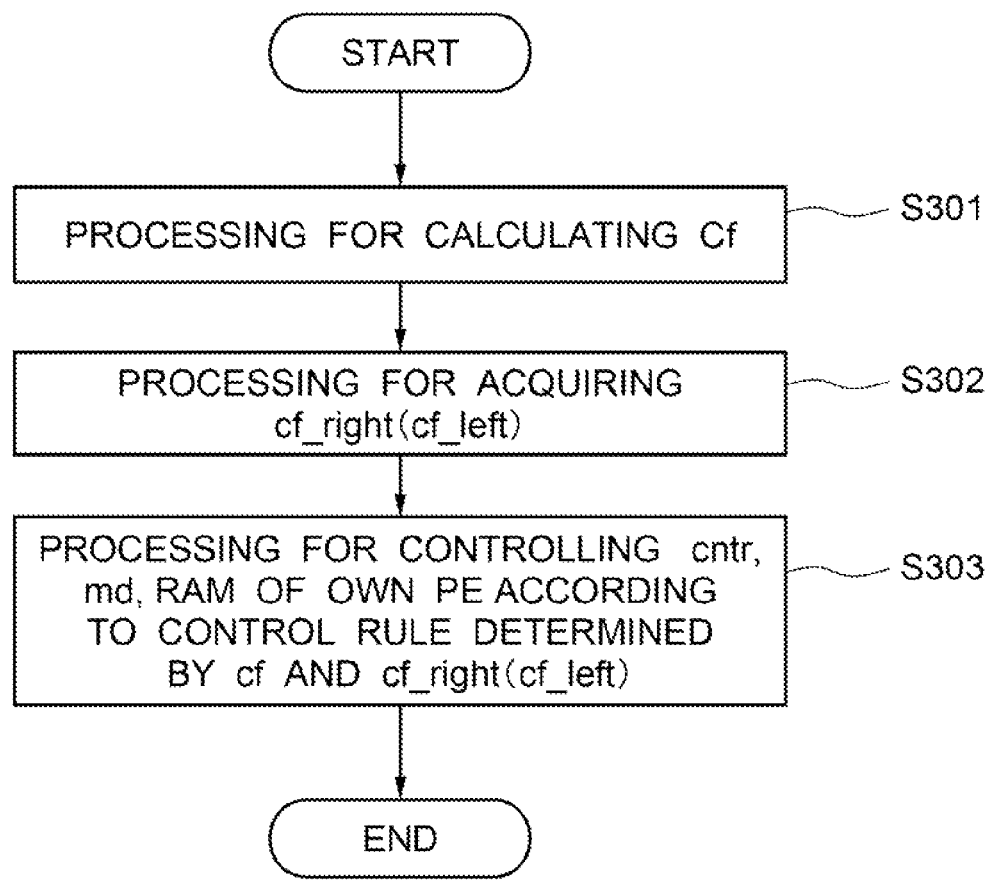
FIG. 10 is a flowchart showing an example of various kinds of processing orders executed in the SIMD parallel computer system according to the fourth embodiment of the present invention.

The processing of each unit of the SIMD parallel computer system according to the embodiment can also be implemented as a method, and the order of the various kinds of processing as the method will be described by referring to FIG. 9 and FIG. 10. FIG. 9 and FIG. 10 are flowcharts showing an example of the processing order executed in the SIMD parallel computer system.

The control method of the control processor according to the embodiment is directed to those that are processed by a computer provided to the control processor of the parallel computer system that includes a plurality of processing elements and the control processor that controls the processing actions of each of the plurality of processing elements.

As the basic structure, the control processor control method can be so designed that the computer provided to the control processor includes: an average value calculation processing step (e.g., step S201 shown in FIG. 9) which performs processing for calculating the average value of the numbers of data sets over the entire processing elements; a transfer processing step (e.g., step S202 shown in FIG. 9) which performs processing for transferring the average value to each average value information temporary storage unit of the entire processing elements; and an execution control step (e.g., step S203 shown in FIG. 9) which performs control processing for repeatedly executing the data distribution leveling instruction which uniformanizes the number of data sets of each processing element until the difference between the number of data sets of the number-of-data-sets storage unit of the processing element and the average value stored in the average value information temporary storage unit becomes equal to or less than 1 between each of the processing elements.

Further, an arithmetic operation processing method of the processing element according to the embodiment is directed to those that are processed by a computer provided to the processing element of the parallel computer system that includes a plurality of processing elements and the control processor that controls the processing actions of each of the plurality of processing elements.

As the basic structure, the arithmetic operation processing method of the processing element can be so designed that the computer provided to the processing element includes: a first comparison result information calculation processing step (e.g., step S301 shown in FIG. 10) which performs processing for calculating first comparison result information of the own processing element that is obtained by comparing a first number-of-data-sets of the own processing element with a second number-of-data-sets of a first neighboring processing element that is one of the neighboring processing elements of the own processing element according to the data distribution leveling instruction from the control processor; a second comparison result information acquiring step (e.g., step S302 shown in FIG. 10) which acquires second comparison result information with a second neighboring processing element that is the other neighboring element; and a leveling processing step (e.g., step S303 shown in FIG. 10) which uniformanizes the number of data sets of each processing element among the processing elements by controlling the data storage unit of the own processing element, the number-of-data-sets storage unit, and the front data storage unit for temporarily storing the front data out of the data in the data storage unit according to the control rules determined by the first comparison result information and the second comparison result information.

The leveling processing step can further include: a comparing step which calculates first comparison result information obtained by comparing the first number-of-data-sets of the own processing element and second number-of-data-sets of the first neighboring processing element that is one of the neighboring elements of the own processing element; an exclusive OR operation step which calculates exclusive OR information between the second comparison result information that is the comparison result with the second neighboring processing element that is the other neighboring element and the first comparison result information; a logical product operation step which calculates logical product information between logic inversion information of the second comparison result information and the first comparison result information; and an add/subtraction operation step which controls to select either the adding operation or the subtraction operation of the first number-of-data-sets and the exclusive OR information based on the logical product information, and calculates the add/subtraction operation information that is the result of the add operation or the subtraction operation.

Other structures, other steps, functions, and working effects thereof are the same as those of the embodiment described above. Further, the operation contents of each of the steps, the structural elements of each unit, and each of the functions thereof described above in the explanations may be put into a program to have it executed by a computer.

Other Various Modification Examples

Further, while the device and the method according to the present invention have been described by referring to some of specific embodiments thereof, it is possible to apply various modifications to the embodiments depicted in the text of the present invention without departing from the technical spirit and the range of the present invention.

Figure 11:
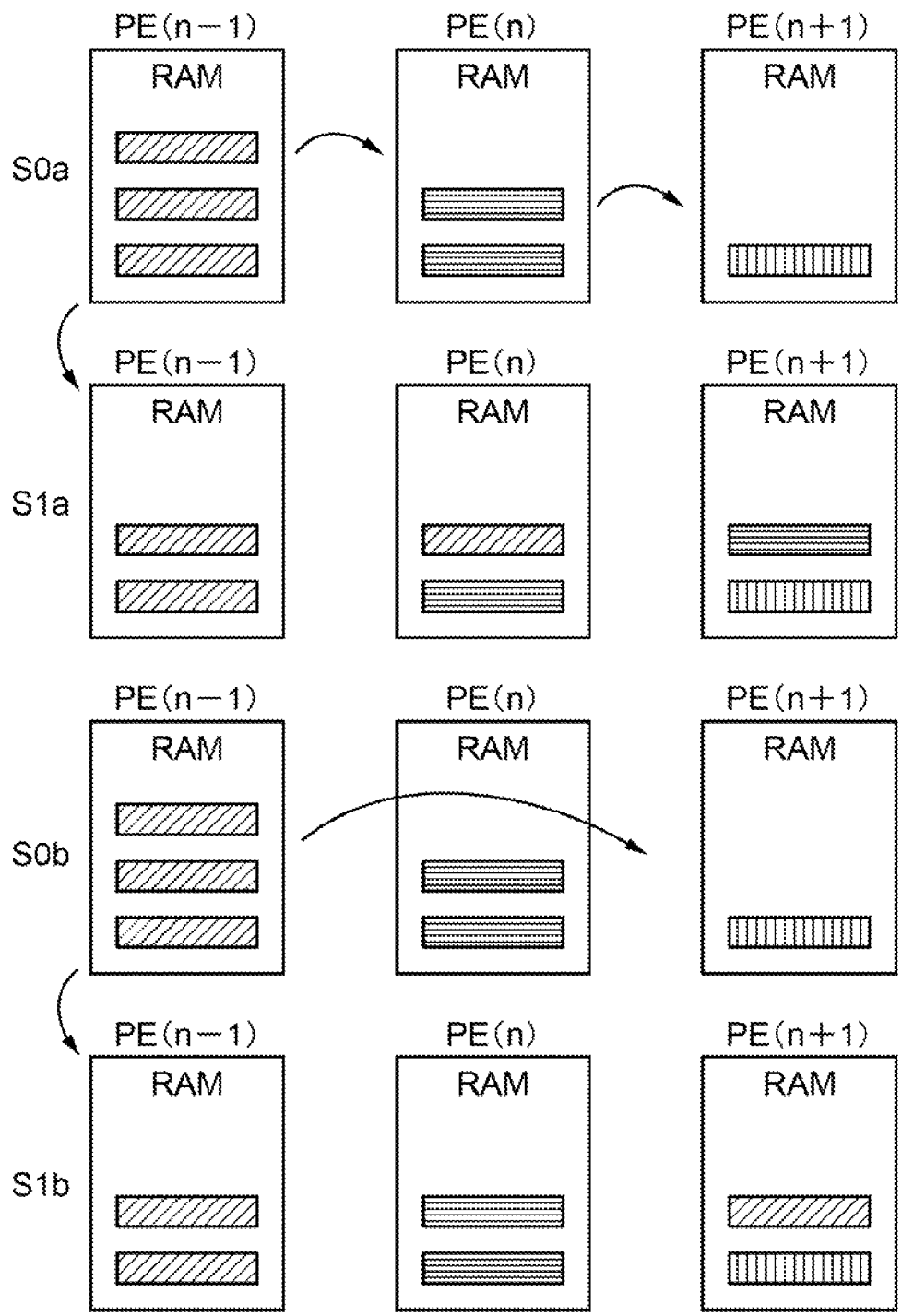
FIG. 11 is an explanatory chart for describing the state and result of actions of each PE by each cycle in an SIMD parallel computer system according to another embodiment of the present invention.

For example, as shown in FIG. 11, it is not limited to a case where the front data of the RAM of PE(n−1) in S0a is transferred to the RAM of PE(n) and the front data of the RAM of PE(n) is transferred to the RAM of PE(n+1) to be S1a. It may also be a case where the front data of the RAM of PE(n−1) in S0b is transferred to the RAM of PE(n+1) via the register (md) without being transferred to the RAM of PE(n) to be S1b.

Figure 12:
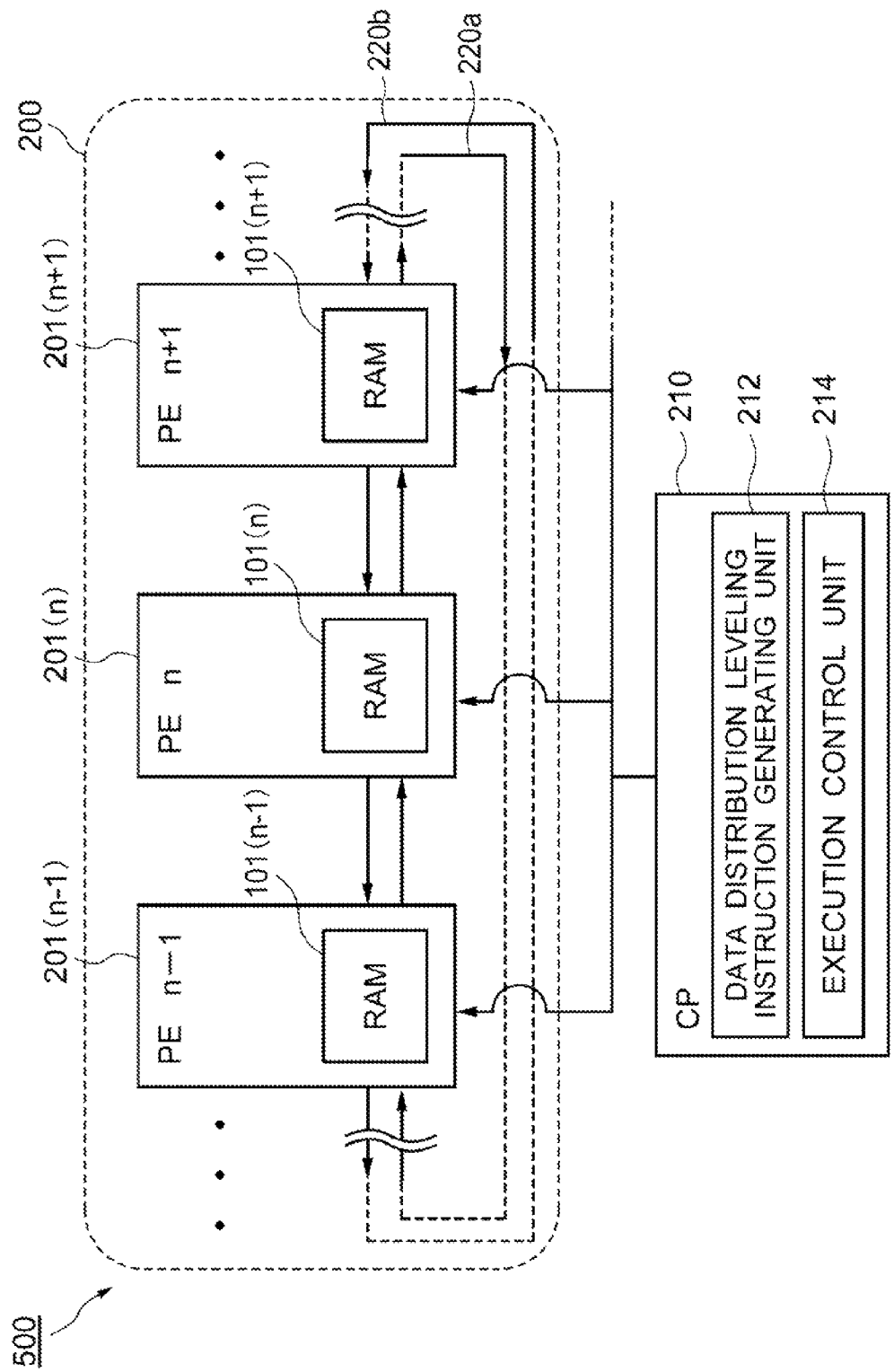
FIG. 12 is a block diagram showing an example of a schematic structure of an entire SIMD parallel computer system according to another embodiment of the present invention.

Further, as shown in FIG. 12, an SIMD parallel computer system 500 may be structured to include the inter-PE coupling line 220a and the inter-PE coupling line 220b by combining the first embodiment and the second embodiment so as to be able to transfer the data that is transferred in the data leveling processing in a given direction by utilizing the inter-PE coupling line 220a and in a reverse direction by utilizing the inter-PE coupling line 220b. In that case, each PE can include both the structure of the first embodiment and the structure of the second embodiment. The control processor can also control to switch a mode in the given direction, a mode in the reverse direction, and a mode utilizing the both.

Figure 13:
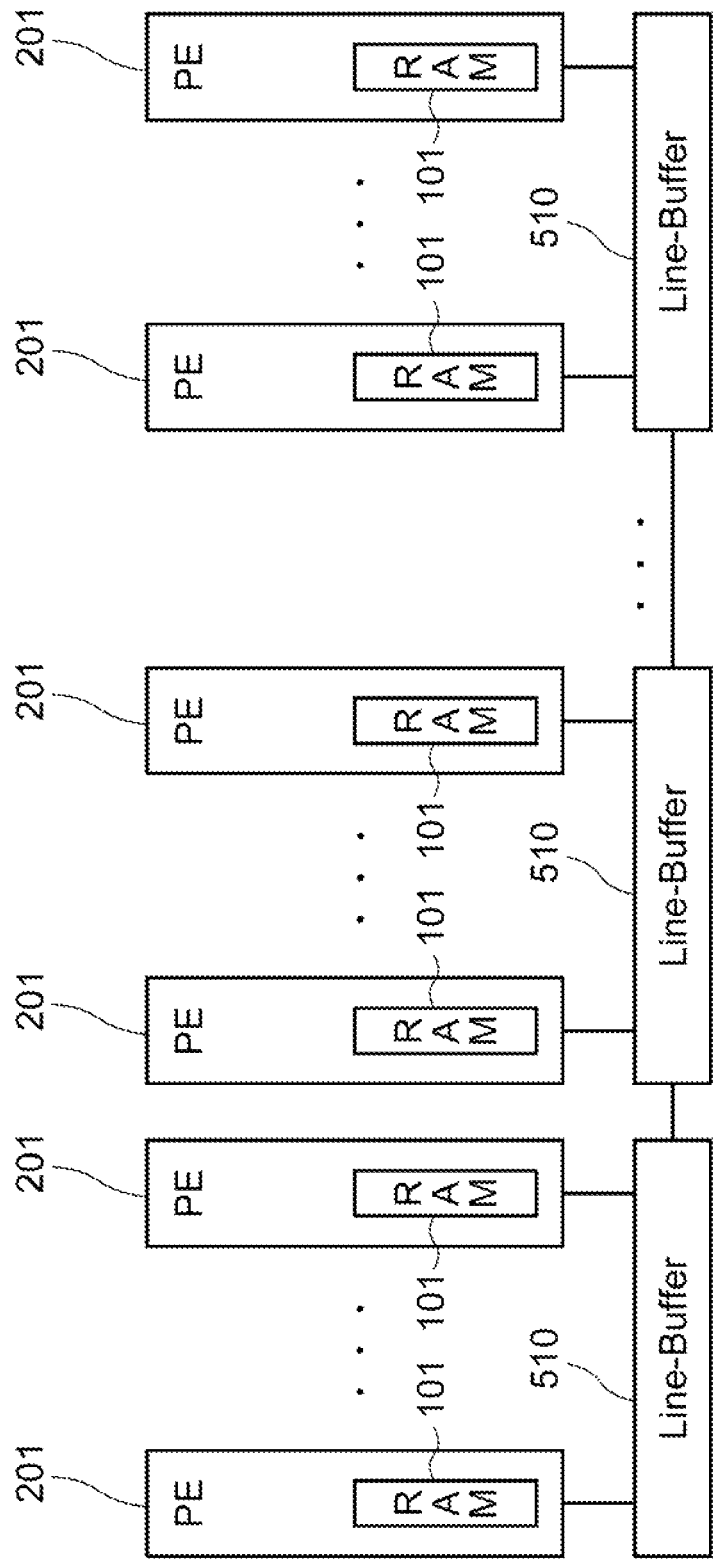
FIG. 13 is a block diagram showing an example of a schematic structure of an entire SIMD parallel computer system according to another embodiment of the present invention.

Further, even though it is omitted in the first embodiment, a line buffer 510 may be provided, respectively, by having each of the plurality of PEs as one block, as shown in FIG. 13.

Furthermore, the number, positions, shapes, and the like of the structural members are not limited only to the embodiments described above, and the number, positions, shapes, and the like that are preferable for embodying the present invention can be employed. That is, while the case of having eight PEs has been described in the embodiments above, the present invention is not limited only to such case.

Figure 14:
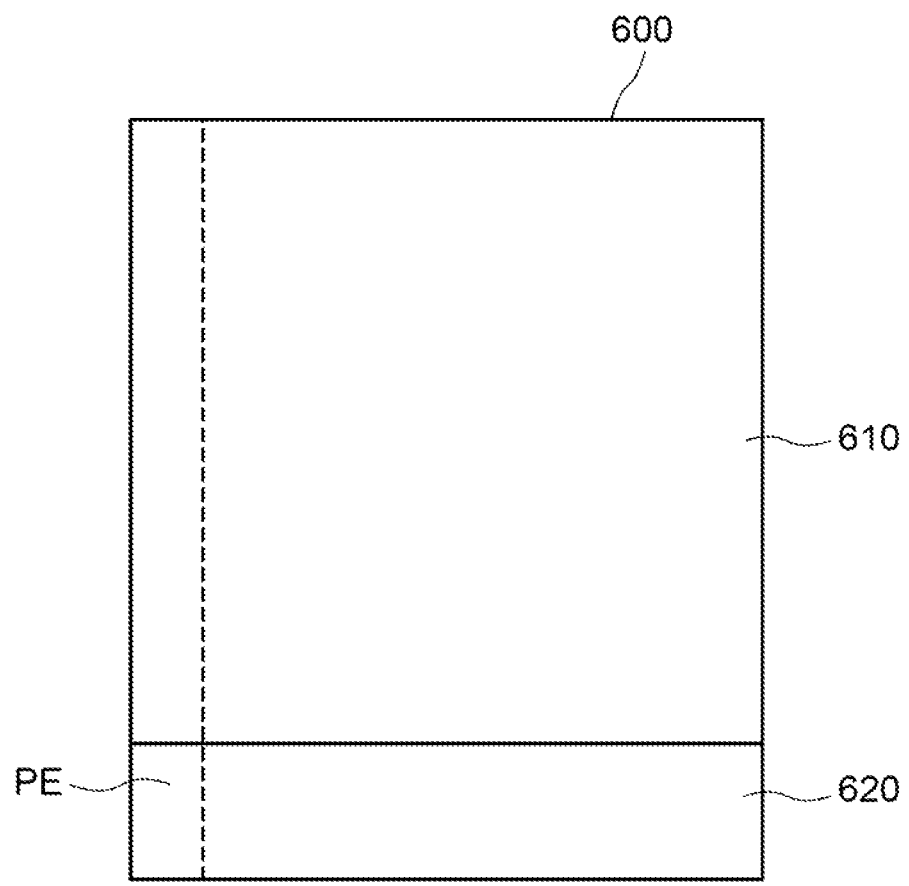
FIG. 14 is an explanatory diagram showing an example of a display device that utilizes the SIMD parallel computer system of the present invention.
Figure 15:
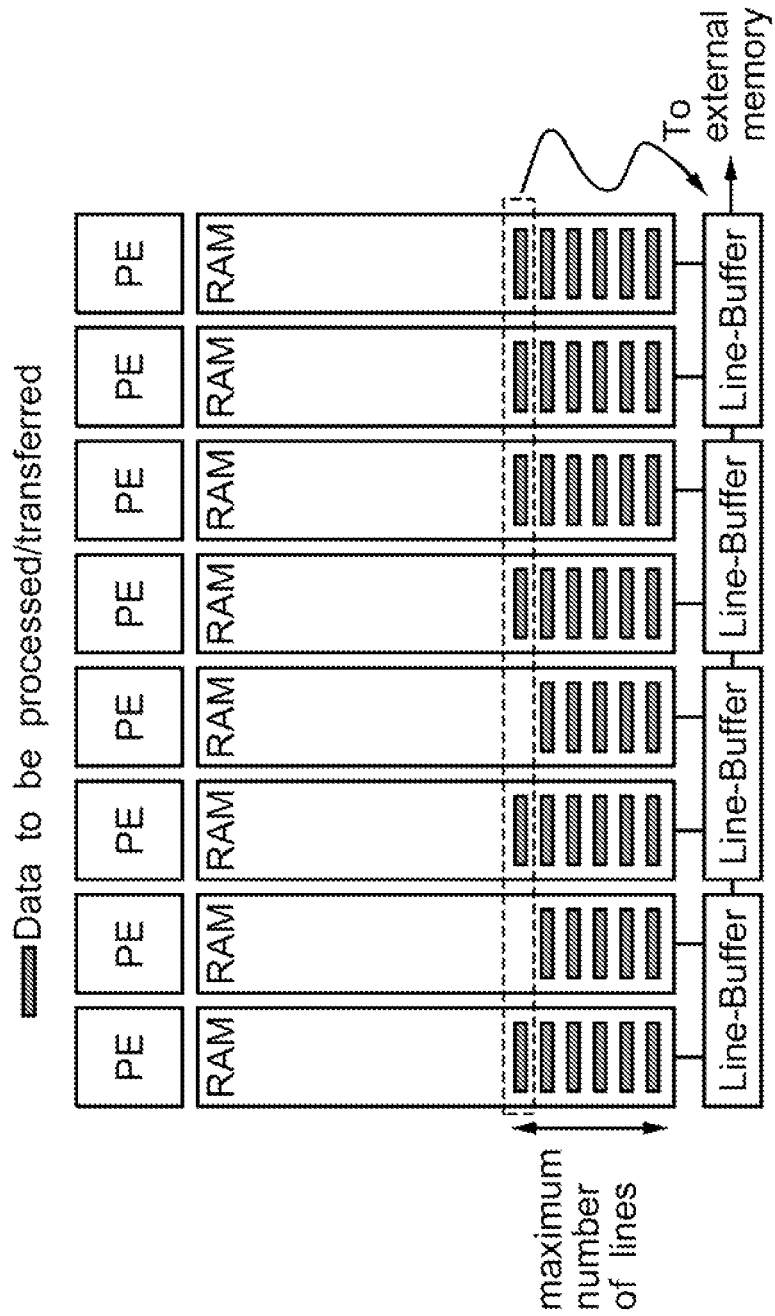
FIG. 15 is an explanatory chart for describing a state where the numbers of processing data sets are leveled among PEs in the SIMD parallel computer system.

Further, the SIMD parallel computer system described above can be structured as a microcomputer loaded on one chip and, further, can form a display device 600 shown in FIG. 14. The display device 600 is provided with a pixel matrix unit 610 and an integrated circuit 620 as a microcomputer so that each PE corresponds to each column of each pixel of the pixel matrix unit 610. With such structure, high-speed image processing can be achieved.

Further, with the SIMD parallel computer system according to each of the above-described embodiments of the present invention, the data distribution leveling instruction generating unit can designate a processing action for moving data by a specific unit data from the one processing element having the larger number-of-data-sets to the other processing element having the smaller number-of-data-sets, when the numbers of data sets are different among each of the processing elements.

Further, each of the processing elements can be connected in parallel, and also can be coupled in a ring form in which the rightmost end processing element is connected to the leftmost end processing element. In that case, the data distribution leveling instruction generating unit can designate to move the data in the leveling processing in one direction between each of the processing elements.

Further, the processing element can include a comparing unit, an exclusive OR operation unit, an add/subtraction operation unit, and a logical product operation unit. In that case, the data distribution leveling instruction generating unit can designate the action for executing in series the comparing unit, the exclusive OR operation unit, the add/subtraction operation unit, and the logical product operation unit.

Furthermore, the processing element can include: a data storage unit which temporarily stores the processing data or the external memory transfer data; and a number-of-data-sets storage unit which counts and temporarily stores the number of data in the data storage unit.

In that case, the comparing unit can calculate the first comparison result information obtained by comparing the first number-of-data-sets of the own processing element with the second number-of-data-sets of the first neighboring processing element that is one of the processing elements neighboring to the own processing element.

The exclusive OR operation unit can calculate exclusive OR information between the second comparison result information that is the comparison result with the second neighboring processing element that is the other neighboring element and the first comparison result information.

The logical product operation unit can calculate logical product information between logic inversion information of the second comparison result information and the first comparison result information.

The add/subtraction operation unit can control to select either the add operation or the subtraction operation of the first number-of-data-sets and the exclusive OR information based on the logical product information, and calculate the add/subtraction operation information that is the result of the add operation or the subtraction operation. Thereby, the number of data sets in the number-of-data-sets storage unit can be updated based on the add/subtraction operation information.

Further, the processing element can include the front data storage unit which temporarily stores the front data out of the data in the data storage unit.

In that case, the logical product operation unit can input the logical product information to the data storage unit as a write enable signal for permitting the write processing of the neighboring front data in the front data storage unit of the first neighboring processing element to the data storage unit of the own processing element.

Further, the add/subtraction operation unit can input the add/subtraction operation information to the data storage unit as the information for designating the address when writing the neighboring front data to the data storage unit.

Furthermore, the comparing unit can input the first comparison result information to the front data storage unit as the information for selecting whether to input the neighboring front data to the front data storage unit or to input the front data in the data storage unit of the own processing element to control the front data that is inputted to the front data storage unit.

Furthermore, the comparing unit can subtract the second number of data sets of the first neighboring processing element as one of the neighboring elements from the first number of data sets of the own processing element, discard the subtraction result, and output carry flag information showing whether or not the second number-of-data-sets is larger than the first number-of-data-sets.

Note here that a part of each block in the block diagrams shown in FIG. 2 and FIG. 5 may be a software module structure that shows a state functionalized by various kinds of programs that are stored in an appropriate memory and executed by a computer.

That is, while the physical structure is a single CPU or a plurality of CPUs (or a single CPU or a plurality of CPUs and a single memory or a plurality of memories), for example, the software structure by each unit (circuit) expresses a plurality of functions implemented by the CPU under the control of the program as the structural elements of a plurality of units (modules), respectively.

The explanations of each unit provided above can be comprehended as explanations of the computer functionalized by the program along with the functions of the program or may be comprehended as explanations of a device formed with a plurality of electronic circuit blocks that are functionalized permanently by intrinsic hardware. Therefore, those functional blocks can be implemented with hardware only, software only, various forms of combinations of those, and are not limited only to any of those.

Further, each unit may be structured as a device, respectively, and a system may be formed with each of those devices. Inversely, it may be a system structured by having each unit as a single device.

(Programs)

The program according to the present invention for achieving the functions of the above-described exemplary embodiments includes a part of or a whole part of the program corresponding to each processing part (processing device), functions, and the like shown in various block diagrams and the like of each of the above-described exemplary embodiments, the program corresponding to the processing procedures, processing devices, functions, and the like shown in flowcharts and the like of the drawings, and the method (steps) depicted generally through the current Specification, the processing and the data described herein.

Specifically, the control program according to one embodiment of the present invention is capable of causing the computer, which is provided to the control processor of the parallel computer system that includes a plurality of processing elements and the control processor that controls the processing actions of each of the plurality of processing elements, to implement various functions.

This control program can cause the computer, to achieve: an average value calculation processing function which performs processing for calculating the average value of the numbers of data sets over the entire processing elements; a transfer processing function which performs processing for transferring the average value to each average value information temporary storage unit of the entire processing elements; and an execution control function which performs control processing for repeatedly executing the data distribution leveling instruction which uniformanizes the number of data sets of each processing element until the difference between the number of data sets of the number-of-data-sets storage unit of the processing element and the average value stored in the average value information temporary storage unit becomes equal to or less than 1 between each of the processing elements.

Further, an arithmetic operation processing program according to one embodiment of the present invention is capable of causing a computer, which is provided to the processing element of the parallel computer system that includes a plurality of processing elements and the control processor that controls the processing actions of each of the plurality of processing elements, to implement various functions.

This arithmetic operation processing program can cause the computer to achieve a first comparison result information calculation processing function which performs processing for calculating first comparison result information of the own processing element that is obtained by comparing a first number-of-data-sets of the own processing element with a second number-of-data-sets of a first neighboring processing element that is neighboring to the own processing element according to the data distribution leveling instruction from the control processor; a second comparison result information acquiring function which acquires second comparison result information with a second neighboring processing element that is the other neighboring element; and a leveling processing function which uniformanizes the number of data sets of each processing element between each of the processing elements by controlling the data storage unit of the own processing element, the number-of-data-sets storage unit, and the front data storage unit for temporarily storing the front data out of the data in the data storage unit of the own processing element according to the control rules determined by the first comparison result information and the second comparison result information.

Examples of the control rules may be following rules (a)-(d) shown in the first embodiment and the second embodiment.

(a) cf is 0 and right_cf (left_cf) is 0: contents of own cntr and own md are not updated.

(b) cf is 0 and right_cf (left_cf) is 1: own cntr is decremented by 1, and the content of own md is updated with next processing or with transfer data.

(c) cf is 1 and right_cf (left_cf) is 0: own cntr is incremented by 1, and the contents of the processing or the transfer data front and own md are updated with the contents of the md of neighboring PE on the left side or the right side.

(d) cf is 1 and right_cf (left_cf) is 1: own cntr is not updated, and the contents of the processing or the transfer data front and own md are updated with the contents of the md of the neighboring PE on the left side or the right side.

With the leveling processing function, the arithmetic operation processing program can cause the computer to achieve: a comparing function which calculates first comparison result information obtained by comparing the first number-of-data-sets of the own processing element and second number-of-data-sets of the first neighboring processing element that is one of the neighboring elements of the own processing element; an exclusive OR operation function which calculates exclusive OR information between the second comparison result information that, is the comparison result with the second neighboring processing element that is the other neighboring element and the first comparison result information; a logical product operation function which calculates logical product information between logic inversion information of the second comparison result information and the first comparison result information; and an add/subtraction operation function which controls to select either the adding operation or the subtraction operation of the first number-of-data-sets and the exclusive OR information based on the logical product information, and calculates the add/subtraction operation information that is the result of the add operation or the subtraction operation.

There is no limit set in regards to the form of the programs, such as programs executed by object codes, interpreters, etc. The programs can be loaded with a high-level procedure type or object directional programming language, or an assembly or a machine language as necessary. In any case, the languages may be a compiler type or an interpreter type.

As a way to supply the control program, it is possible to provide the program from an external device via an electric telecommunication line (wired or radio) that is connected to be capable of communicating with the computer via the electric telecommunication line.

With the program according to the present invention, the device according to the present invention described above can be executed relatively easily by loading the program to the computer (CPU) from a recording medium such as a ROM to which the program is stored and by having it executed, or by downloading the program to the computer via a communication module and by having it executed. When the present invention is embodied as the software of the device as the embodied example of the spirit of the present invention, there naturally is a recording medium on which the software is recorded to be used.

Further, there is no difference at all regarding the products whether it is a primary duplicate or a secondary duplicate. When the program is supplied by using the communication line, the present invention is utilized by having the communication line as a transmission medium. Furthermore, dependent claims regarding the device may be applied as dependent claims regarding the method and the program to correspond to the dependent claims of the device.

(Information Recording Medium)

The above-described programs (including the control program) may be recorded on an information recording medium. The above-described programs can be provided by being recorded to the information recording medium such as a magnetic recording medium, an optical recording medium, or a ROM. The use of an information recording medium having such programs recorded therein in the computer can provide a preferable information processing device.

As the information recording medium for supplying the program, semiconductor memories and integrated circuits such as ROMs, RAMs, flash memories, SRAMs, or USB memories and memory cards including those, optical disks, magneto-optical disks, magnetic recording mediums, and the like may be used. Furthermore, the program may be recorded on portable media such as flexible disks, CD-ROMs, CD-Rs, CD-RWs, FDs, DVDROMs, HDDVDs (HDDVD-R-SLs (single layer), HDDVD-R-DLs (double layer), HDDVD-RW-SLs, HDDVD-RW-DLs, HDDVD-RAM-SLs), DVD±R-SLs, DVD±R-DLs, DVD±RW-SLs, DVD±RW-DLs, DVD-RAMs, Blu-Ray Disks (registered trademark) (BD-R-SLs, BD-R-DLs, BD-RE-SLs, BD-RE-DLs), MOs, ZIPs, magnetic cards, magnetic tapes, SD cards, memory sticks, nonvolatile memory cards, IC cards, or a storage device such as hard disks that are built-in to computer systems.

Further, the "information recording medium" also includes a form which kinetically holds the program for a short period of time (transmission medium or carrier wave), e.g., a communication line when transmitting the program via communication circuit lines such as networks of the Internet and telephone lines, etc., and also includes a form which holds the program for a specific period of time, e.g., a volatile memory provided inside the computer system to be a server or a client in the above case.

Furthermore, the "system" means a logical aggregation of a plurality of devices, and it does not matter whether or not each of the structural elements is within a single casing. In such case, it is possible to be applied to a system constituted with a plurality of apparatuses or to a device formed with a single apparatus.

Further, the steps shown in the flowcharts of the current Specification include not only the processing executed in a time series manner according to the described procedures, but also the processing that may be executed in parallel or individually but not necessarily processed in a time series manner. Further, in the actual implementation, the order of executing the program procedures (steps) can be changed. Furthermore, at the time of implementation, it is possible to mount, eliminate, add, or reallocate the specific procedures (steps) described in the current Specification as combined procedures (steps) as necessary.

Moreover, the functions of the program, e.g., each device, each function, and the procedures of each step of the device, may be achieved by exclusive hardware (for example, exclusive semiconductor circuit). A part of the whole functions of the program may be processed by the hardware, and the other functions of the whole functions may be processed by the use of software. In the case of using the exclusive hardware, each unit may be formed with an integrated circuit such as LSI. These may be formed on a single chip individually, or may be formed on a single chip including a part of or a whole part. Further, LSI may include other functional blocks. The way of integration is not limited only to LSI. An exclusive circuit or a general-purpose processor may also be employed. Further, when there is a technique related to integration of circuits developed in replacement for LSI due to advancement in the semiconductor technology or another technique derived therefrom, such technique may naturally be used for integrating the functional blocks.

Further, the control method by EQL instruction is not necessarily limited to a substantial device, and it is easily understood to be able to function as a method thereof. Thus, the present invention regarding the method is not necessarily limited to a substantial device, and it is true to be effective as a method thereof. In that case, as examples of implementing the method, it is possible to include an SIMD parallel computer system, a microcomputer, a control processor, a processing device, and the like.

Such device may exist alone or may be used while being mounted into a certain apparatus (e.g., a display device), and the technical spirit of the present invention is not limited only to such cases but include various modes. Thus, the present invention can be changed as appropriate such as being in a form of software or hardware. When it is formed as software of the device as an example of the embodiment of the technical spirit of the present invention, there naturally exits a storage medium to which the software is stored to be used.

Further, a part thereof may be achieved by the software and another part may be achieved by the hardware. It may also be in a form where a part is stored on a recording medium to be loaded properly as necessary. When the present invention is achieved with the software, it is possible to be structured to use hardware and an operating system, or may be achieved separately from those.

Furthermore, it is to be understood that the scope of the present invention is not limited to the examples shown in the drawings.

Moreover, each of the exemplary embodiments includes various stages, and various kinds of inventions can be derived therefrom by properly combining a plurality of feature elements disclosed therein. That is, the present invention includes combinations of each of the above-described embodiments or combinations of any of the embodiments and any of the modification examples thereof. In that case, even though it is not specifically mentioned in the embodiments, the operational effects that are obvious from each structure disclosed in each of the embodiments and the modification examples thereof can naturally be included as the operational effects of the embodiments. Inversely, the structures that can provide all the operational effects depicted in the embodiments are not necessarily the essential feature elements of the substantial feature parts of the present invention. Furthermore, the present invention can include structures of other embodiments in which some of the feature elements are omitted from the entire feature elements of the above-described embodiments, as well as the technical scope of the structures based thereupon.

The descriptions regarding each of the embodiments including the modification examples thereof are presented merely as examples of various embodiments of the present invention (i.e., examples of concretive cases for embodying the present invention) for implementing easy understanding of the present invention. It is to be understood that those exemplary embodiments and the modification examples thereof are illustrative examples, and not intended to set any limitations therewith. The present invention can be modified and/or changed as appropriate. Further, the present invention can be embodied in various forms based upon the technical spirit or the main features thereof, and the technical scope of the present invention is not to be limited by the embodiments and the modification examples thereof.

Therefore, each element disclosed above is to include all the possible design changes and the equivalents that fall within the technical scope of the present invention.

This Application is the National Phase of PCT/JP2009/057205, filed Apr. 8, 2009, which claims the Priority right based on Japanese Patent Application No. 2008-111448 filed on Apr. 22, 2008, and the disclosure thereof is hereby incorporated by reference in its entirety.

INDUSTRIAL APPLICABILITY

The present invention makes it possible to achieve, at a low cost, an SIMD parallel computer system which is capable of efficiently performing data distribution leveling processing when the numbers of data sets of processing or transfer data are unbalanced among PEs.

REFERENCE NUMERALS

1 SIMD parallel computer system
101($n$−1), 101($n$), 101($n$+1) RAM (data storage unit)
102($n$−1), 102($n$) Register (cntr) (number-of-data-sets storage unit)
103($n$−1), 103($n$) Register (md) (front data storage unit)
104($n$−1), 104($n$) Subtraction operation unit (sub)
105($n$−1), 105($n$) Logical product operation unit (and)
106($n$−1), 106($n$) Exclusive OR operation unit (xor)
107($n$−1), 107($n$) Add/subtraction operation unit (and/sub)
110($n$−1), 110($n$) Leveling processing unit
200 PE array
201($n$−1), 201($n$), 201($n$+1) PE (processing element) (leveling processing device)
210 Control processor (CP)
212 Data distribution leveling instruction generating unit
214 Execution control unit
220 Inter-PE coupling line

The invention claimed is:

1. An SIMD parallel computer system that performs parallel processing with two or more processing elements coupled in a ring form for different data values under a single instruction stream, wherein each of the processing elements comprises:
a data storage module that stores data processed by each of the processing elements;
a number-of-data-sets storage device that stores number of data sets of the data; and
a data storage device that stores a part of the data stored in the data storage module, the system further comprising
a control processor that compares first number-of-data-sets of the data stored in the number-of-data-sets storage device of one processing element out of the two or more processing elements coupled in the ring form with second number-of-data-sets of the data stored in the number-of-data-sets storage device of the own processing element, and issues, to each of the processing elements, a data distribution leveling instruction that designates an action for updating contents of the data stored in the data storage module, the number-of-data-sets storage device, and the data storage device of the own processing element according to a rule that is determined based on a comparison result of the own processing element, and a comparison result of the other processing elements and an action for moving the data stored in the one processing element to the own processing element, wherein the control processor calculates carry flag information in a case where the first number-of-data-sets out of the numbers of data sets to be compared is larger than the second number-of-data-sets, and issues the data distributing leveling instruction according to the rule that is determined by the carry flag information and carry flag information that is obtained by logic-inverting the carry flag information calculated in neighboring another processing element, wherein the control processor calculates carry flag information "1" when the first number-of-data-sets out of the numbers of data sets to be compared is larger than the second number-of-data-sets, and carry flag information "0" when the former is smaller, wherein the control processor further holds following information as the rule:

(1) Contents in the number-of-data-sets storage device and the front data storage device of the own processing element are not updated, when the carry flag information in the own processing element is "0" and the carry flag information that is obtained by logic-inverting the carry flag information calculated in neighboring another processing element is "0";

(2) The number of data sets of the number-of-data-sets storage device of the own processing element is decremented by 1, and the content of the front data storage device is updated with next processing data or next transfer data following the front data, when the carry flag information in the own processing element is "0" and the carry flag information that is obtained by logic-inverting the carry flag information calculated in neighboring another processing element is "1";

(3) The number of data sets of the number-of-data-sets storage device of the own processing element is incremented by 1, and the content of the front data storage device is updated with the content of the front data of the processing data or the transfer data of the neighboring processing element, when the carry flag information in the own processing element is "1" and the carry flag information that is obtained by logic-inverting the carry flag information calculated in neighboring another processing element is "0"; and (4) The number of data sets of the number-of-data-sets storage device of the own processing element is not updated, and the content of the front data storage device is updated with the content of the front data of the processing data or the transfer data of the neighboring processing element, when the carry flag information in the own processing element of the own processing element is "1" and the carry flag information that is obtained by logic-inverting the carry flag information calculated in neighboring another processing element is "1", wherein the control processor issues the data distribution leveling instruction according to the rule.

2. The SIMD parallel computer system as claimed in claim 1, wherein the control processor obtains an average value of the numbers of data sets of the processing data or the transfer data over the entire processing elements that are coupled in the ring form, and continues to issue the data distribution leveling instruction until a difference between the number of data sets of the processing data or the transfer data of the entire processing and the average value becomes equal to or less than a threshold value.

3. An SIMD parallel computing method that performs parallel processing with two or more processing elements coupled in a ring form for different data values under a single instruction stream, the method comprising:

comparing first number-of-data-sets of processing data or transfer data stored in one neighboring processing element out of the two or more processing elements coupled in the ring form with second number-of-data-sets of processing data or transfer data stored in the number-of-data-sets storage device of the own processing element;

issuing, to each of the processing elements, a data distribution leveling instruction that designates an action for updating contents of the data stored in the own processing element according to a rule that is determined based on the comparison result and a comparison result of the other neighboring processing elements, and an action for moving the processing data or the transfer data stored in the one neighboring processing element to the own processing element;

calculating carry flag information in a case where the first number-of-data-sets out of the numbers of data sets to be compared is larger than the second number-of-data-sets; and issuing the data distributing leveling instruction according to the rule that is determined by the carry flag information and carry flag information that is obtained by logic-inverting the carry flag information calculated in neighboring another processing element; and calculating carry flag information "1" when the first number-of-data-sets out of the numbers of data sets to be compared is larger than the second number-of-data-sets and calculating carry flag information "0" when the former is smaller, and issuing the data distribution leveling instruction according to following information set as the rule:

(1) Contents of in the number of data sets and the data of the own processing element are not updated, when the carry flag information in the own processing element is "0" and the carry flag information that is obtained by logic-inverting the carry flag information calculated in neighboring another processing element is "0";

(2) The number of data sets of the own processing element is decremented by 1, and the data is updated with transfer data, when the carry flag information in the own processing element is "0" and the carry flag information that is obtained by logic-inverting the carry flag information calculated in neighboring another processing element is "1";

(3) The number of data sets of the own processing element is incremented by 1, and the data is updated with the processing data or the transfer data of the neighboring processing element, when the carry flag information in the own processing element is "1" and the carry flag information that is obtained by logic-inverting the carry flag information calculated in neighboring another processing element is "0"; and (4) The number of data sets of the own processing element is not updated, and the data is updated with the processing data or the transfer data of the neighboring processing element, when the carry flag information in the own processing element is "1" and the carry flag information that is obtained by logic-inverting the carry flag information calculated in neighboring another processing element is "1".

4. The SIMD parallel computing method as claimed in claim 3, comprising:

obtaining an average value of the numbers of data sets of the processing data or the transfer data over the entire processing elements that are coupled in the ring form; and continuing to issue the data distribution leveling instruction until a difference between the number of data sets of the processing data or the transfer data of the entire processing and the average value becomes equal to or less than a threshold value.

5. A non-transitory computer readable recording medium storing an SIMD parallel computer program that performs controls of parallel processing with two or more processing elements coupled in a ring form for different data values under a single instruction stream, wherein each of the processing elements comprises:

a data storage module that stores data processed by each of the processing elements;

a number-of-data-sets storage device that stores number of data sets of the data; and a data storage device that stores a part of the data stored in the data storage module, the program causing a computer to execute:

a function that compares first number-of-data-sets of the data stored in the number-of-data-sets storage device of one processing element out of the two or more processing elements coupled in the ring form with second number-of-data-sets of the data stored in the number-of-data-sets storage device of the own processing element;

a function that issues, to each of the processing elements, an instruction designating an action for updating contents of the data stored in the data storage module, the number-of-data-sets storage device, and the data storage device of the own processing element according to a rule that is determined based on a comparison result of the own processing element and a comparison result of the other processing elements acquired;

a function that issues, to each of the processing elements, an instruction designating an action for moving the data stored in the one processing element to the own processing element;

a function that calculates carry flag information in a case where the first number-of-data-sets out of the numbers of data sets to be compared is larger than the second number-of-data-sets; a function that issues the data distributing leveling instruction according to the rule that is determined by the carry flag information and carry flag information that is obtained by logic-inverting the carry flag information calculated in neighboring another processing element;

a function that calculates carry flag information "1" when the first number-of-data-sets out of the numbers of data sets to be compared is larger than the second number-of-data-sets, and carry flag information "0" when the former is smaller, and a function that issues the data distribution leveling instruction according to following information held by the computer as the rule:

(1) Not update contents in the number-of-data-sets storage device and the front data storage device of the own processing element, when the carry flag information in the own processing element is "0" and the carry flag information that is obtained by logic-inverting the carry flag information calculated in neighboring another processing element is "0";

(2) Decrement by 1 the number of data sets of the number-of-data-sets storage device of the own processing element, and update the content of the front data storage device with next processing data or next transfer data following the front data, when the carry flag information in the own processing element is "0" and the carry flag information that is obtained by logic-inverting the carry flag information calculated in neighboring another processing element is "1";

(3) Increment by 1 the number of data sets of the number-of-data-sets storage device of the own processing element, and update the content of the front data storage device with the content of the front data of the processing data or the transfer data of the neighboring processing element, when the carry flag information in the own processing element is "1" and the carry flag information that is obtained by logic-inverting the carry flag information calculated in neighboring another processing element is "0"; and (4) Not update the number of data sets of the number-of-data-sets storage device of the own processing element, and update the content of the front data storage device with the content of the front data of the processing data or the transfer data of the neighboring processing element, when the carry flag information in the own processing element of the own processing element is "1" and the carry flag information that is obtained by logic-inverting the carry flag information calculated in neighboring another processing element is "1".

6. The non-transitory computer readable recording medium storing the SIMD parallel computer program as claimed in claim 5, which causes the computer to execute:

a function that obtains an average value of the numbers of data sets of the processing data or the transfer data over the entire processing elements that are coupled in the ring form; and a function that continues to issue the data distribution leveling instruction until a difference between the number of data sets of the processing data or the transfer data of the entire processing and the average value becomes equal to or less than a threshold value.

7. An SIMD parallel computer system that performs parallel processing with two or more processing elements coupled in a ring form for different data values under a single instruction stream, wherein each of the processing elements comprises:

data storage means for storing data processed by each of the processing elements;

number-of-data-sets storage means for storing number of data sets of the data; and data storage means for storing a part of the data stored in the data storage means, the system further comprising control processor means for comparing first number-of-data-sets of the data stored in the number-of-data-sets storage means of one processing element out of the two or more processing elements coupled in the ring form with second number-of-data-sets of the data stored in the number-of-data-sets storage means of the own processing element, and issuing, to each of the processing elements, a data distribution leveling instruction that designates an action for updating contents of the data stored in the data storage means, the number-of-data-sets storage means, and the data storage means of the own processing element according to a rule that is determined based on a comparison result of the own processing element, and a comparison result of the other processing elements and an action for moving the data stored in the one processing element to the own processing element, wherein the control processor means calculates carry flag information in a case where the first number-of-data-sets out of the numbers of data sets to be compared is larger than the second number-of-data-sets, and issues the data distributing leveling instruction according to the rule that is determined by the carry flag information and carry flag information that is obtained by logic-inverting the carry flag information calculated in neighboring another processing element, wherein the control processor means calculates carry flag information "1" when the first number-of-data-sets out of the numbers of data sets to be compared is larger than the second number-of-data-sets, and carry flag information "0" when the former is smaller, wherein the control processor means further holds following information as the rule:

(1) Contents in the number-of-data-sets storage device and the front data storage device of the own processing element are not updated, when the carry flag information in the own processing element is "0" and the carry flag information that is obtained by logic-inverting the carry flag information calculated in neighboring another processing element is "0";

(2) The number of data sets of the number-of-data-sets storage device of the own processing element is decremented by 1, and the content of the front data storage device is updated with next processing data or next transfer data following the front data, when the carry flag information in the own processing element is "0" and the carry flag information that is obtained by logic-inverting the carry flag information calculated in neighboring another processing element is "1";

(3) The number of data sets of the number-of-data-sets storage device of the own processing element is incremented by 1, and the content of the front data storage device is updated with the content of the front data of the processing data or the transfer data of the neighboring processing element, when the carry flag information in the own processing element is "1" and the carry flag information that is obtained by logic-inverting the carry flag information calculated in neighboring another processing element is "0"; and (4) The number of data sets of the number-of-data-sets storage device of the own processing element is not updated, and the content of the front data storage device is updated with the content of the front data of the processing data or the transfer data of the neighboring processing element, when the carry flag information in the own processing element of the own processing element is "1" and the carry flag information that is obtained by logic-inverting the carry flag information calculated in neighboring another processing element is "1", wherein the control processor issues the data distribution leveling instruction according to the rule.

* * * * *